: US009288040B2

(12) United States Patent
Endo et al.

(10) Patent No.: US 9,288,040 B2
(45) Date of Patent: Mar. 15, 2016

(54) ENCRYPTION DEVICE

(75) Inventors: Tsukasa Endo, Tokyo (JP); Yuichi Komano, Kanagawa (JP); Koichi Fujisaki, Kanagawa (JP); Hideo Shimizu, Kanagawa (JP); Hanae Ikeda, Tokyo (JP); Atsushi Shimbo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 366 days.

(21) Appl. No.: 13/585,391

(22) Filed: Aug. 14, 2012

(65) Prior Publication Data

US 2012/0307997 A1 Dec. 6, 2012

Related U.S. Application Data

(63) Continuation of application No. PCT/JP2010/052654, filed on Feb. 22, 2010.

(51) Int. Cl.
  *H04L 9/06* (2006.01)
  *H04L 9/00* (2006.01)

(52) U.S. Cl.
  CPC .............. *H04L 9/0631* (2013.01); *H04L 9/003* (2013.01)

(58) Field of Classification Search
  CPC ...... H04L 9/0631; H04L 9/0618; H04L 9/003
  USPC .................................................... 380/37, 28
  See application file for complete search history.

(56) References Cited

U.S. PATENT DOCUMENTS 5,623,548 A * 4/1997 Akiyama ................ H04L 9/002
  380/28
6,898,756 B1 * 5/2005 Fekri ................... H03M 13/134
  714/746

(Continued)

FOREIGN PATENT DOCUMENTS

JP  2000-066585  3/2000
JP  2005-031471  2/2005

(Continued)

OTHER PUBLICATIONS

Yen et al.; A new chaotic key-based design for image encryption and decryption; Published in: Circuits and Systems, 2000; Proceedings. ISCAS 2000 Geneva. The 2000 IEEE International Symposium on (vol. 4 ); Date of Conference: 2000; pp. 49-52 vol. 4; IEEE Xplore.*

(Continued)

*Primary Examiner* — Bradley Holder
(74) *Attorney, Agent, or Firm* — Finnegan, Henderson, Farabow, Garrett & Dunner, L.L.P.

(57) ABSTRACT

According to an embodiment, an encryption device performs encryption processing using an encryption key and calculates encrypted data from plain data. The encryption device includes: a register; an input unit configured to receive plain data; a first partial encryption unit configured to calculate first intermediate data from the plain data; a second partial encryption unit configured to calculate (i+1)-th intermediate data based on i-th intermediate data and the encryption key; a first transform unit configured to: transform j-th intermediate data into j-th transformed data; and store the j-th transformed data in the register; and a second transform unit configured to transform the j-th transformed data into the j-th intermediate data; a third partial encryption unit configured to calculate encrypted data from the N-th intermediate data. The second partial encryption unit is configured to repeat processing to calculate (j+1)-th intermediate data while j is equal to from 1 to N−1.

3 Claims, 21 Drawing Sheets

(56) References Cited

U.S. PATENT DOCUMENTS

| | | | |
|---|---|---|---|
| 6,940,975 B1 | 9/2005 | Kawamura et al. | |
| 7,071,725 B2 | 7/2006 | Fujisaki et al. | |
| 7,085,386 B2 * | 8/2006 | Audebert et al. | 380/281 |
| 7,159,115 B2 | 1/2007 | Fujisaki et al. | |
| 7,511,636 B2 * | 3/2009 | Takahashi | 341/50 |
| 8,023,643 B2 | 9/2011 | Fujisaki et al. | |
| 2003/0091184 A1 * | 5/2003 | Chui | H04K 1/00 380/37 |
| 2004/0170280 A1 * | 9/2004 | Fekri | G06F 17/148 380/255 |
| 2004/0177251 A1 * | 9/2004 | Hayashi | H04N 1/00217 713/161 |
| 2005/0055596 A1 * | 3/2005 | Abe | H04L 9/003 713/500 |
| 2006/0177052 A1 * | 8/2006 | Hubert | 380/29 |
| 2007/0071235 A1 | 3/2007 | Fujisaki et al. | |
| 2007/0140478 A1 | 6/2007 | Komano et al. | |
| 2008/0292100 A1 * | 11/2008 | Komano | H04L 9/003 380/29 |
| 2010/0014664 A1 * | 1/2010 | Shirai et al. | 380/44 |
| 2011/0200190 A1 | 8/2011 | Hisakado | |
| 2011/0268266 A1 | 11/2011 | Fujisaki et al. | |

FOREIGN PATENT DOCUMENTS

| | | |
|---|---|---|
| JP | 2005-086670 | 3/2005 |
| JP | 2007-96973 | 4/2007 |
| JP | 2007-189659 | 7/2007 |
| JP | 2008-292742 | 12/2008 |
| JP | 2010-232709 | 10/2010 |
| JP | 2011-169977 | 9/2011 |
| WO | WO 2006/112114 A1 | 10/2006 |

OTHER PUBLICATIONS

Tang; Methods for encrypting and decrypting MPEG video data efficiently; Published in: Proceeding Multimedia '96 Proceedings of the fourth ACM international conference on Multimedia; 1996; pp. 219-229; ACM Digital Library.*

Waddle et al.; "Towards Efficient Second-Order Power Analysis", CHES 2004, LNCS 3156, pp. 1-15, (2004).

Endo et al.; "Improvement of Secure S-Box Calculation Based on the Fourier Transform", Abstracts of the 2010 Symposium on Cryptography and Information Security, pp. 1-6, (2010).

Peeters et al.; "Improved Higher-Order Side-Channel Attacks With FPGA Experiments", [on-line], CHES2005, pp. 1-15, (2005).

Notice of Rejection issued by the Japanese Patent Office on May 14, 2013, for Japanese Patent Application No. 2012-500445, and English-language translation thereof.

International Search Report issued by the Japanese Patent Office on Apr. 27, 2010, for International Patent Application No. PCT/JP2010/052654.

* cited by examiner

ENCRYPTION DEVICE

CROSS-REFERENCE TO RELATED APPLICATIONS

This application is a continuation of PCT international application Ser. No. PCT/JP2010/052654 filed on Feb. 22, 2010 which designates the United States; the entire contents of which are incorporated herein by reference.

FIELD

Embodiments relate to encryption devices.

BACKGROUND

A symmetric key cipher is a technique that transforms plain data into intermediate data using a partial encryption processing based on an encryption key to calculate. The technique repeats a plurality of steps of partial encryption processing to update the intermediate data, and then performs a partial encryption processing on the final intermediate data to calculate encrypted data. Various side channel attacks, which analyze the encryption key, have been contrived. The attacks use physical information such as processing time, power consumption, and radiated electromagnetic waves during an operation of an encryption module. Among the side channel attacks, exemplary analysis methods that use the power consumption information include Simple Power Analysis (SPA), Differential Power Analysis (DPA), and Correlation Power Analysis (CPA). The DPA is an attack method that predicts a part of the encryption key. The DPA statistically analyzes the intermediate data which is calculated from the predicted encryption key and plain data, and power consumption during the encryption processing. The DPA determines whether or not the predicted encryption key is correct, so as to identify the encryption key. For the DPA, analysis methods that are called second-order DPA and Zero-Offset 2DPA (ZO-2DPA) are further proposed.

As a countermeasure against the DPA and CPA, a mask method is known. The mask method is a technique that adds a random number called a mask onto intermediate data under encryption processing and then continues the encryption processing. This eliminates the correlation between power consumption and the intermediate data.

Power consumption of a register in a CMOS circuit depends on the number of bit transitions of data at continuous clocks. The encryption device stores intermediate data under the encryption processing in a register and calculates encrypted data from plain data. The power consumption has strong correlation with the Hamming distance of the intermediate data, which is output from continuous partial encryption processing. Thus, if the intermediate data output from the encryption processings is directly stored into a register, an encryption key is possibly analyzed by statistically analyzing the power consumption and the intermediate data. Accordingly, to ensure enhanced resistance against power analysis, the register is required to be protected such that power consumption at the register does not have correlation with the intermediate data.

There is a need to provide an encryption device with resistance against power analysis.

DETAILED DESCRIPTION

Figure 1:
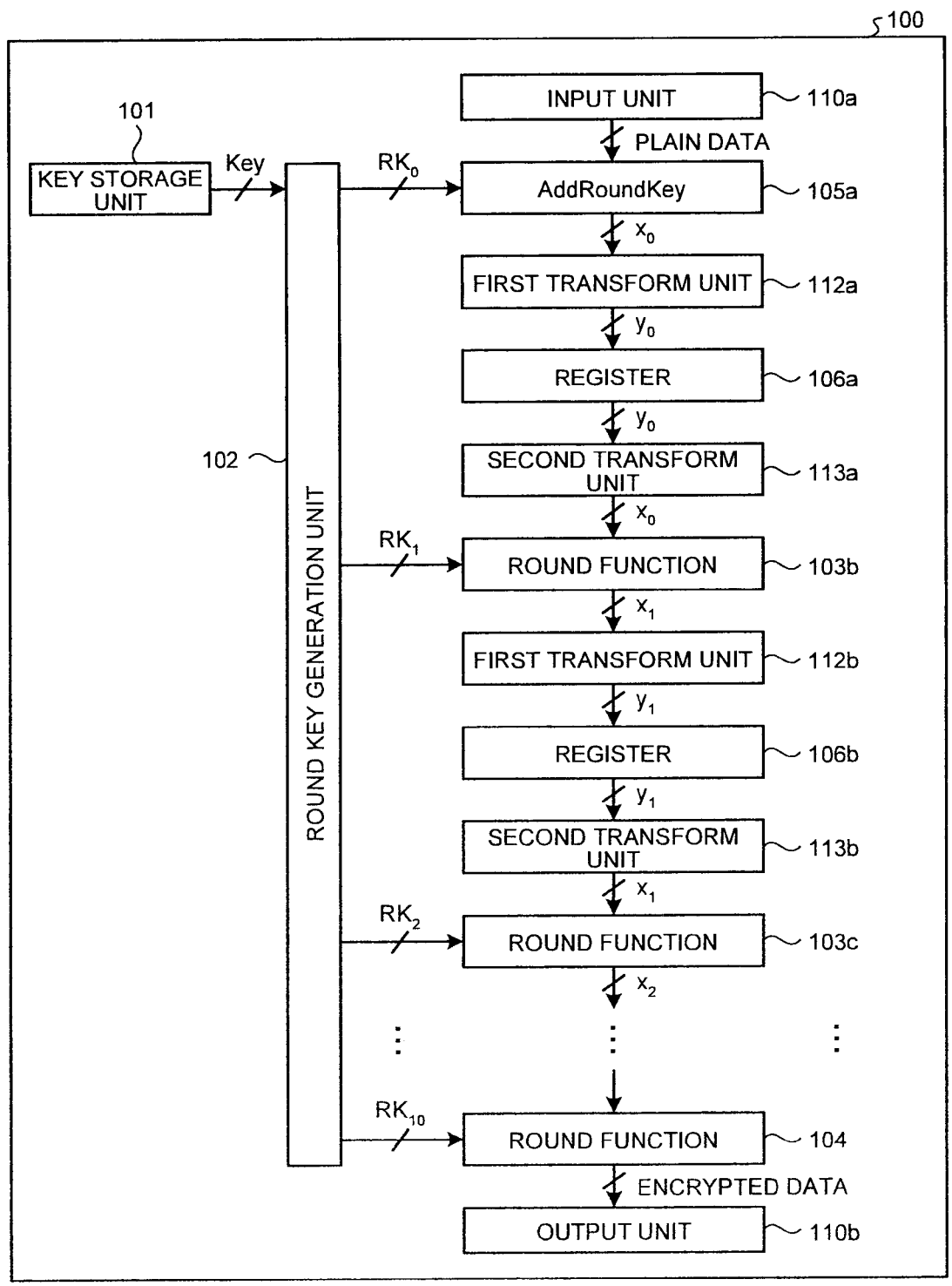
FIG. 1 is a block diagram illustrating an encryption device according to a first embodiment.

According to an embodiment, an encryption device performs encryption processing using an encryption key and calculates encrypted data from plain data. The encryption device includes: a register; an input unit configured to receive plain data; a first partial encryption unit configured to calculate first intermediate data from the plain data; a second partial encryption unit configured to calculate (i+1)-th intermediate data based on i-th intermediate data (where i is an integer equal to or grater than one and smaller than N, and N is a predetermined integer equal to or greater than two) and the encryption key; a first transform unit configured to: transform j-th intermediate data (where j is an integer equal to or grater than one and equal to or smaller than N) into j-th transformed data; and store the j-th transformed data in the register; a second transform unit configured to transform the j-th transformed data stored in the register into the j-th intermediate data; a third partial encryption unit configured to calculate encrypted data from the N-th intermediate data; and an output unit configured to output the encrypted data. The second partial encryption unit is configured to repeat processing to calculate (j+1)-th intermediate data while j is equal to from 1 to N−1, the processing being repeated based on the j-th intermediate data and the encryption key, the j-th intermediate data being transformed from the j-th transformed data by the second transform unit.

Hereinafter, embodiments of encryption devices will be described in detail with reference to the accompanying drawings.

First Embodiment

An encryption device according to a first embodiment transforms intermediate data of encryption processing into protected data, which is unpredictable from outside, and stores the protected data into a register. The encryption device performs inverse transform when reading out the protected data. Accordingly, the data stored in the register is protected. This provides an encryption device that is more secure against attack methods that analyze an encryption key embedded in encryption module by measuring an amount of power consumption during encryption processing.

The following describes an exemplary encryption device that uses an AES (Advanced Encryption Standard) scheme with a key length of 128 bits. In the following example, a round function of AES or the like is used as partial encryption processing. The partial encryption processing represents a processing that is performed during encryption processing for calculating encrypted data from plain data. In the case of AES, for example, SubByte, ShiftRow, MixColumn, AddRoundKey, and a round function including SubByte, ShiftRow, MixColumn, and AddRoundKey correspond to the partial encryption processing.

The key length is not necessarily 128 bits. The key length of 192 or 256 bits may also be similarly applicable. The method stores N pieces (N is a predetermined integer equal to or greater than two) of intermediate data into a storage unit such as a register so as to perform encryption processing with a repetition of partial encryption processing or the like. This method is applicable to an encryption device that uses any other encryption algorithm. For example, the method is applicable to an encryption device that performs encryption using DES (Data Encryption Standard) or Hierocrypt.

FIG. 1 is a block diagram illustrating an exemplary configuration of an encryption device 100 according to the first embodiment. As illustrated in FIG. 1, the encryption device 100 includes an input unit 110a, an output unit 110b, a key storage unit 101, a round key generation unit 102, an AddRoundKey 105a, round functions 103b to 103j and 104, first transform units 112a to 112j, registers 106a to 106j, second transform units 113a to 113j.

The input unit 110a receives an input of plain data from the outside. The output unit 110b outputs encrypted data as a processing result to the outside. The configuration may include an input/output unit 110 having both functions of the input unit 110a and the output unit 110b.

The key storage unit 101 stores a 128-bit secret key. The key storage unit 101 can be formed by a generally used storage medium such as a HDD (Hard Disk Drive), an optical disk, a memory card, and RAM (Random Access Memory).

The round key generation unit 102 calculates eleven round keys $RK_0$ to $RK_{10}$, which are 128-bit round keys, from the secret key stored in the key storage unit 101, and supplies the round keys $RK_0$ to $RK_{10}$ to the AddRoundKey 105a and the round functions 103b to 103j. The round keys $RK_0$ to $RK_{10}$ may be calculated in advance before the execution of the AddRoundKey 105a or may be calculated in parallel with the execution of the round functions 103b to 103j and 104.

The AddRoundKey 105a (a first partial encryption unit) performs AddRoundKey transform processing, which is defined by AES encryption, on the plain data, thus outputting intermediate data $x_0$.

Figure 2:
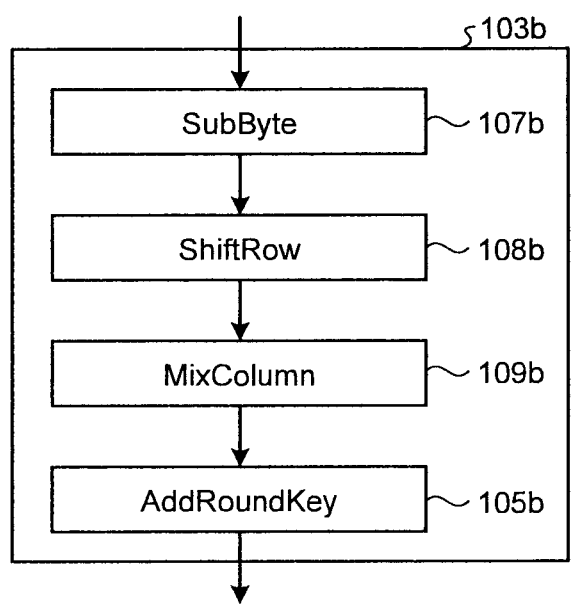
FIG. 2 is a block diagram of a round function.

The round functions 103b to 103j (second partial encryption units) and the round function 104 (a third partial encryption unit) mix the plain data or data stored in the registers 106a to 106j using the round keys. FIG. 2 is a block diagram illustrating an exemplary configuration of the round functions 103b to 103j. While FIG. 2 illustrates an exemplary configuration of the round function 103b, the round functions 103c to 103j each include a similar configuration.

As illustrated in FIG. 2, the round function 103b includes a SubByte 107b, a ShiftRow 108b, a MixColumn 109b, and an AddRoundKey 105b.

The SubByte 107b nonlinearly transforms data stored in the register 106a for every eight bits. The ShiftRow 108b rearrange data of the processing result of the SubByte 107b in units of eight-bit blocks. The MixColmun 109b linearly transforms data of the processing result of the ShiftRow 108b for every 32 bits. The AddRoundKey 105b calculates an exclusive OR of the processing result of the MixColmun 109b and the round key $RK_1$ which is calculated by the round key generation unit 102. The AddRoundKey 105b stores the processing result of the exclusive OR in the register 106b.

The round functions 103c to 103j mix the data stored in the registers 106b to 106i, which are output in the previous round, with similar procedures. The round functions 103c to 103j store the processing results in the registers 106c to 106j.

Figure 3:
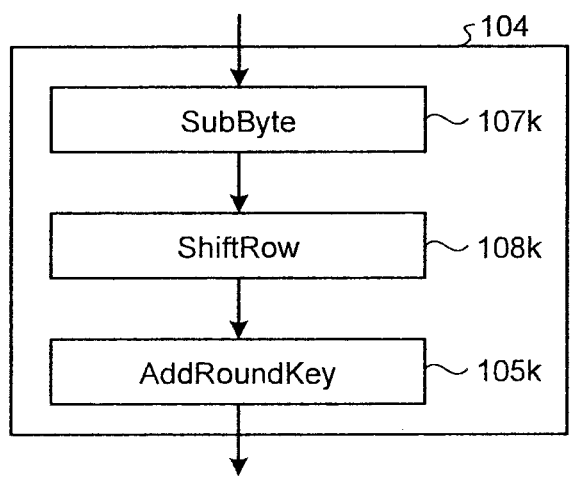
FIG. 3 is a block diagram of a round function.

FIG. 3 is a block diagram illustrating an exemplary configuration of the round function 104. As illustrated in FIG. 3, the round function 104 includes a SubByte 107k, a ShiftRow 108k, and an AddRoundKey 105k.

The SubByte 107k nonlinearly transforms data stored in the register 106j for every eight bits. The ShiftRow 108k rearrange data of the processing result of the SubByte 107k in units of eight-bit blocks. The AddRoundKey 105k calculates an exclusive OR of the processing result of the ShiftRow 108k and $RK_{10}$, which are calculated by the round key generation unit 102. The AddRoundKey 105k outputs the processing result from the output unit 110b.

As described above, the AddRoundKey 105a outputs the intermediate data $x_0$ (first intermediate data). The round functions 103b to 103j output respective intermediate data $x_1$ to $x_9$ (second intermediate data to tenth intermediate data). Thus, data generated in each round is referred to as intermediate data below. The round function 104 outputs data $x_{10}$ as encrypted data.

The first transform units 112a to 112j transform the intermediate data $x_0$ to $x_9$ which are output from the AddRoundKey 105a and the round functions 103b to 103j through predetermined transform processing. Hereinafter, the intermediate data transformed by the first transform units 112a to 112j are referred to as transformed data. The first transform units 112a to 112j output transformed data $y_0$ to $y_9$, which are transform results of the intermediate data $x_0$ to $x_9$, to the registers 106a to 106j.

The registers 106a to 106j store the transformed data $y_0$ to $y_9$.

The second transform units 113a to 113j, transform the data $y_0$ to $y_9$, which are stored in the registers 106a to 106j, through predetermined transform processing. This decrypts the intermediate data $x_0$ to $x_9$. The second transform units 113a to 113j input the respective decrypted data to the next round functions. The steps of transform processing by the second transform units 113a to 113j correspond to inverse transform steps of the transform processing by the first transform units 112a to 112j. That is, these steps are steps of transform processing that transforms the data after transforms by the first transform units 112a to 112j into the data before transforms by the first transform units 112a to 112j.

In FIG. 1, the processors, which execute the steps of processing in each round, are separated. The processors with the same number include the same function and configuration. Hereinafter, alphabets of the processors with different alphabets suffixed to the same number will occasionally be omitted. The processors with different alphabets suffixed to the same number may be integrated. The one integrated processor may be configured to execute the steps of processing in each round. For example, the registers 106a to 106j may be configured as one register 106.

Figure 4:
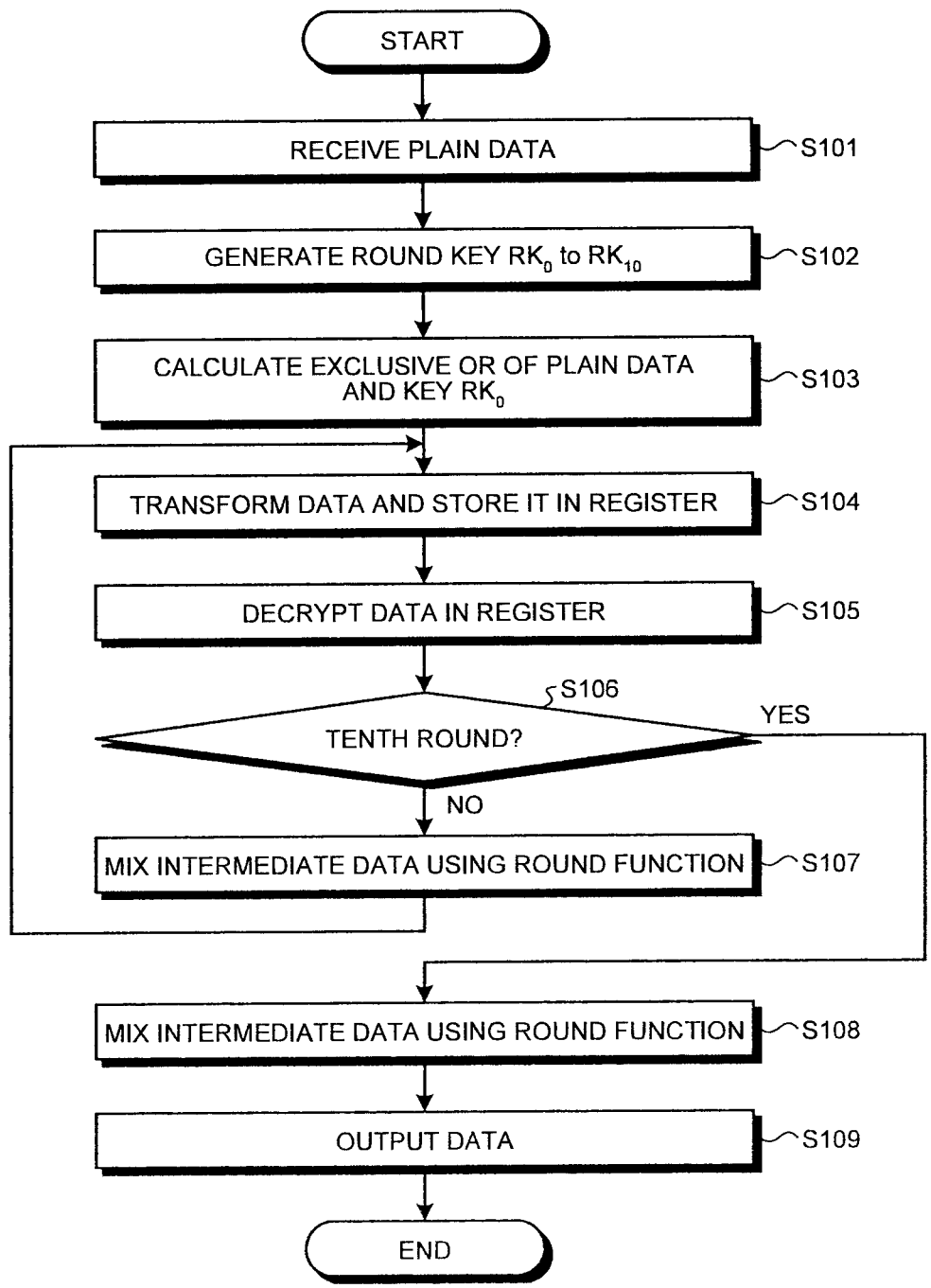
FIG. 4 is a flowchart illustrating an overall flow of the encryption processing according to the first embodiment.

Next, the encryption processing by the encryption device 100 according to the first embodiment thus configured will be described by referring to FIG. 4. FIG. 4 is a flowchart illustrating an overall flow of the encryption processing according to the first embodiment.

First, the input unit 110a receives the plain data (step S101). Next, the round key generation unit 102 calculates the eleven round keys $RK_0$ to $RK_{10}$, which are 128-bit round keys, using the secret key stored in the key storage unit 101 (step S102). Then, the AddRoundKey 105a calculates the intermediate data $x_0$. The intermediate data $x_0$ is the exclusive OR of the 128-bit plain data, which is received at the input unit 110a, and the round key $RK_0$, which is calculated by the round key generation unit 102 (step S103).

Next, the first transform unit 112a performs transform processing to transform the output intermediate data $x_0$ into the transformed data $y_0$, and stores the transformed data $y_0$ in the register 106a (step S104). The second transform unit 113a performs transform processing to transform $y_0$ stored in the register 106a into the intermediate data $x_0$, and decrypts the intermediate data $x_0$ (step S105). The encryption device 100 determines whether or not the round number is tenth (step S106). When the round number is first to ninth (No in step S106), the round functions 103b to 103j mix the respective pieces of intermediate data that are output from the second transform unit 113a to 113i (step S107).

In the round function 103b, as described above, the pieces of intermediate data are mixed by the SubByte 107b, the ShiftRow 108b, the MixColmun 109b, and the AddRoundKey 105b, and the processing result is stored in the register 106b. The round functions 103c to 103j in the second to ninth rounds perform the processing similar to that of the round function 103b. Thus, description thereof will be omitted.

Next, the first transform units 112b to 112j transform the respective intermediate data $x_1$ to $x_9$, which are output from the respective round functions 103b to 103j, into the transformed data $y_1$ to $y_9$. The first transform units 112b to 112j store the respective transformed data $y_1$ to $y_9$ in the registers 106b to 106j (step S104). Next, the second transform units 113b to 113j decrypt the respective transformed data $y_1$ to $y_9$, which are stored in the respective registers 106b to 106j, to the intermediate data $x_1$ to $x_9$ (step S105).

When the round number is determined to be tenth in step S106 (Yes in step S106), the round function 104 mixes the intermediate data $x_9$ (step S108). In the round function 104, as described above, the pieces of intermediate data are mixed by the SubByte 107k, the ShiftRow 108k, and the AddRoundKey 105k. The processing result is output to the output unit 110b.

The output unit 110b outputs the data $x_{10}$ which is the processing result of the round function 104 (step S109).

Figure 5:
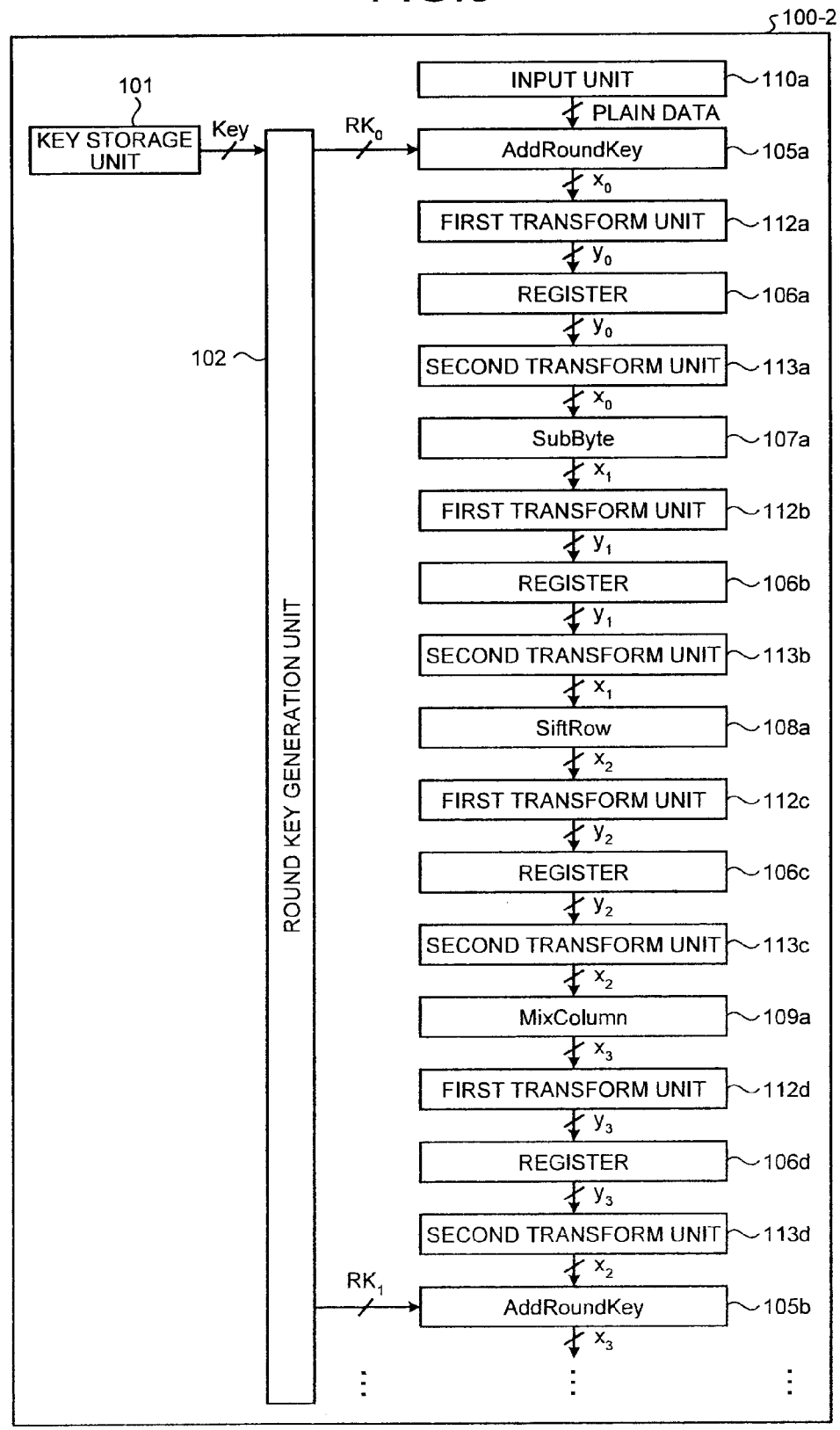
FIG. 5 is a configuration diagram of arrangement between AddRoundKey and SubByte, between SubByte and ShiftRow, between ShiftRow and MixColumn, and between MixColumn and AddRoundKey.

The partial encryption processing may be one of processings of the SubByte, the ShiftRow, the MixColumn, and the AddRoundKey. A first transform unit 112, the register 106, and a second transform unit 113 may be arranged at any of between AddRoundKey and SubByte, between SubByte and ShiftRow, between ShiftRow and MixColumn, and between MixColumn and AddRoundKey in the processing of the encryption device 100. FIG. 5 is a configuration diagram illustrating an arrangement in all of between AddRoundKey and SubByte, between SubByte and ShiftRow, between ShiftRow and MixColumn, and between MixColumn and AddRoundKey.

Figure 6:
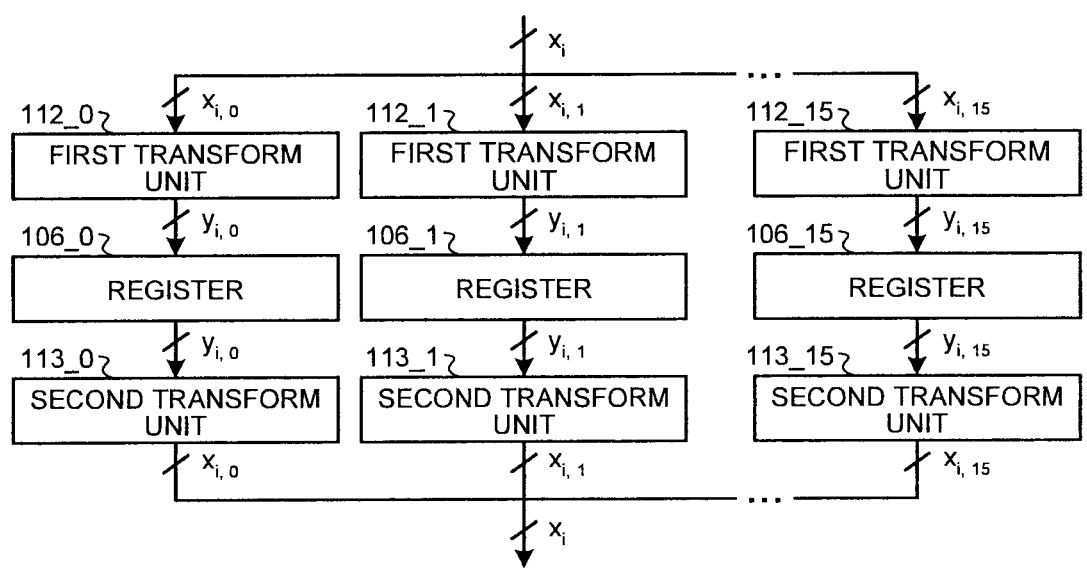
FIG. 6 is a diagram illustrating an exemplary configuration where 128-bit data is processed by eight bits.

The first transform units 112, the registers 106, and the second transform units 113 may be configured to perform the processing by processing units that are a plurality of pieces of divided data. FIG. 6 is a diagram illustrating an exemplary configuration where 128-bit data is processed by eight bits. The processing unit is not limited to eight bits, and may be 16 or 128 bits. A different number of bits may be used as the processing unit.

As illustrated in FIG. 6, the first transform units 112 are each divided into first transform units 112_0 to 112_15 that transform data in each processing unit. Similarly, the registers 106 are each divided into registers 106_0 to 106_15. The second transform units 113 are each divided into second transform units 113_0 to 113_15.

Processing in the first round (i=0) will be described by referring to FIG. 6. Similar processing is executed at and after the second round (i=1 to 9). The 128-bit data $x_0$ under the encryption processing is divided into sixteen pieces of data $x_{0,0}, x_{0,1}, \ldots, x_{0,15}$ for every eight bits.

$$x_0 = x_{0,0} \| x_{0,1} \| \ldots \| x_{0,15} \text{ (where } \| \text{ means division)}$$

The first transform units 112_0 to 112_15 receive the respective data $x_{0,0}$ to $x_{0,15}$ and output eight-bit transformed data $y_{0,0}$ to $y_{0,15}$. The registers 106_0 to 106_15 store the transformed data $y_{0,0}$ to $y_{0,15}$, which are output from the first transform units 112_0 to 112_15. The second transform units 113_0 to 113_15 receive the transformed data $y_{0,0}$ to $y_{0,15}$, which are output from the registers 106_0 to 106_15 and output the intermediate data $x_{0,0}$ to $x_{0,15}$. The intermediate data $x_{0,0}$ to $x_{0,15}$ are integrated and output as the 128-bit intermediate data $x_0$.

Figure 7:
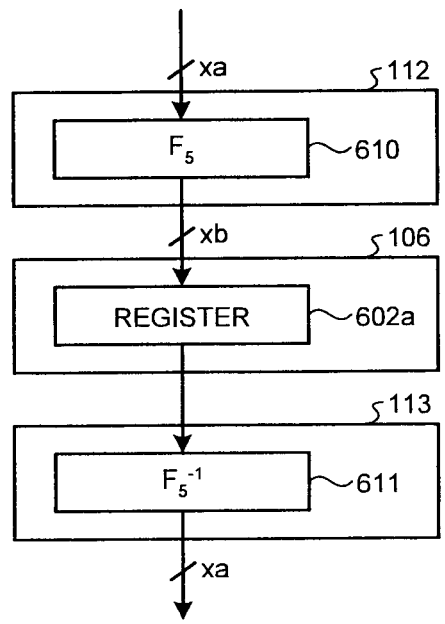
FIG. 7 is a block diagram of a first transform unit, a register, and a second transform unit, each of which process data in units is of eight bits, according to the first embodiment.

Next, examples of specific configurations of the first transform units 112, the registers 106, and the second transform units 113 will be further described. FIG. 7 is a block diagram illustrating an exemplary configuration of the first transform units 112, the registers 106, and the second transform units 113 that operate in units of eight bits as illustrated in FIG. 6. Similar configuration may be used for a processing unit other than the 8-bit processing unit.

The first transform unit 112 includes a function operator 610 that operates a function $F_5$ having an inverse function. The register 106 includes a register 602a. The register 106 includes the register 602a for ease of explanation. This means that the register 106 includes the register 602a as a storage unit (or a region) that stores at least one piece of data (xb in FIG. 7). As described later, the register 106 may include a plurality of the registers 602a, 602b and so on in the case where a plurality of pieces of data is stored. The second transform unit 113 includes an inverse function operator 611 that operates an inverse function $F_5^{-1}$ of the function $F_5$.

The first transform unit 112 receives eight-bit data xa (intermediate data) under the encryption processing, transforms the data xa into the eight-bit data xb (transformed data) with the function $F_5$, and outputs the data xb. The register 602a stores the data xb, which is output from the first transform unit 112. The second transform unit 113 decrypts the eight-bit data xb, which is stored in the register 602a, to the eight-bit data xa using the function $F_5^{-1}$, and outputs the data xa.

Figure 8:
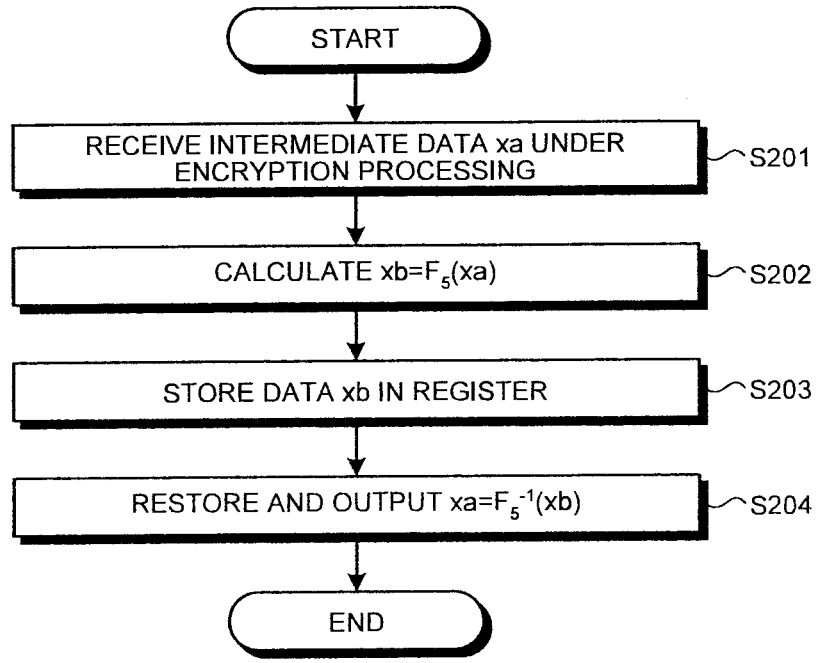
FIG. 8 is a flowchart illustrating an overall flow of data transform processing according to the first embodiment.

Next, data transform processing by the first transform unit 112, the register 106, and the second transform unit 113 according to the first embodiment thus configured will be described by referring to FIG. 8. FIG. 8 is a flowchart illustrating an overall flow of the data transform processing according to the first embodiment.

First, the first transform unit 112 receives the data xa under encryption processing (step S201). The function operator 610 transforms the data xa into the data xb with the function $F_5$, and outputs the transformed data xb (step S202). The register 602a stores the data xb, which is output from the first transform unit 112 (step S203). The inverse function operator 611 of the second transform unit 113 transforms the data xb, which is stored in the register 602a, into the data xa with the function $F_5^{-1}$, and outputs the data xa (step S204).

The function $F_5$ of the function operator 610 employs a function F(x) expressed by, for example, one of the following expressions (1) to (4).

$$F(x)=Ax \quad (1)$$

$$F(x)=Ax+b \quad (2)$$

$$F(x)=A(x+b) \quad (3)$$

$$F(x)=A(x+b)+c \quad (4)$$

At this time, the function $F_5^{-1}$ of the inverse function operator 611 employs a function $F^{-1}(x)$ expressed by one of the following expressions (5) to (8).

$$F^{-1}(x)=A^{-1}x \quad (5)$$

$$F^{-1}(x)=A^{-1}(x+b) \quad (6)$$

$$F^{-1}(x)=A^{-1}x+b \quad (7)$$

$$F^{-1}(x)=A^{-1}(x+c)+b \quad (8)$$

The inverse functions of the functions F expressed by the expressions (1), (2), (3), and (4) are respectively expressed by the respective expressions (5), (6), (7), and (8).

Here, eight-bit data x is an argument of a function expressed in a matrix with eight rows and one column. A matrix A is a matrix with eight rows and eight columns that has an inverse matrix $A^{-1}$. Matrices b and c are each a matrix with eight rows and one column. Any matrix can be selected for the respective matrices.

For example, the matrices A, $A^{-1}$, b, and c may employ matrices expressed by the following expressions (9) to (12).

$$A = \begin{pmatrix} 1 & 0 & 0 & 0 & 0 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \\ 0 & 1 & 1 & 1 & 1 & 0 & 0 & 0 \\ 0 & 0 & 1 & 1 & 1 & 1 & 0 & 0 \\ 0 & 0 & 0 & 1 & 1 & 1 & 1 & 0 \\ 0 & 0 & 0 & 0 & 1 & 1 & 1 & 1 \end{pmatrix} \quad (9)$$

$$A^{-1} = \begin{pmatrix} 0 & 1 & 1 & 1 & 1 & 1 & 1 & 1 \\ 1 & 1 & 0 & 0 & 0 & 0 & 0 & 0 \\ 1 & 0 & 1 & 0 & 1 & 1 & 0 & 0 \\ 1 & 0 & 0 & 1 & 1 & 0 & 1 & 0 \\ 1 & 1 & 1 & 1 & 1 & 1 & 1 & 0 \\ 1 & 1 & 0 & 0 & 1 & 1 & 0 & 0 \\ 1 & 0 & 1 & 0 & 1 & 0 & 1 & 0 \\ 1 & 0 & 0 & 1 & 1 & 0 & 0 & 1 \end{pmatrix} \quad (10)$$

$$b = \begin{pmatrix} 1 \\ 0 \\ 1 \\ 1 \\ 0 \\ 1 \\ 0 \\ 0 \end{pmatrix} \quad (11)$$

$$c = \begin{pmatrix} 0 \\ 0 \\ 1 \\ 1 \\ 1 \\ 0 \\ 0 \\ 1 \end{pmatrix} \quad (12)$$

It is preferred that the function $F_5$ of the function operator 610 not employ a function where only an order of bits of the eight-bit data x is rearranged such as the following expression (13).

$$F(x) = \begin{pmatrix} 0 & 0 & 0 & 0 & 0 & 1 & 0 & 0 \\ 0 & 0 & 0 & 0 & 0 & 0 & 1 & 0 \\ 0 & 0 & 0 & 1 & 0 & 0 & 0 & 0 \\ 1 & 0 & 0 & 0 & 0 & 0 & 0 & 0 \\ 0 & 1 & 0 & 0 & 0 & 0 & 0 & 0 \\ 0 & 0 & 0 & 0 & 0 & 0 & 0 & 1 \\ 0 & 0 & 1 & 0 & 0 & 0 & 0 & 0 \\ 0 & 0 & 0 & 0 & 1 & 0 & 0 & 0 \end{pmatrix} x \quad (13)$$

Accordingly, in the encryption device according to the first embodiment, the intermediate data under the encryption processing is transformed with a predetermined function. The transformed data is stored in the register. Power consumption of the register has correlation with the data stored in the register, but does not have correlation with the intermediate data under the encryption processing. In view of this, the correlation between the intermediate data under the encryption processing and the power consumption is eliminated, thus ensuring resistance against power analysis.

Second Embodiment

The above-described second-order DPA and ZO-2DPA can overcome some mask methods. For example, the second-order DPA determines the presence/absence of the correlation between power consumption and intermediate data under encryption processing in consideration of an effect of a mask using power at two points on a power consumption waveform. The ZO-2DPA is a method that generates a new waveform by squaring a value at respective points of a power consumption waveform and then performs DPA processing with the new waveform. The ZO-2DPA can identify an encryption key when intermediate data with the mask (masked data) and the mask affect power consumption at the same time. If the masked intermediate data and the mask are directly stored in a register, the masked intermediate data and the mask affect power consumption at the same time. Thus, the encryption key is possibly analyzed by the ZO-2DPA. Therefore, an encryption device according to the second embodiment uses a mask method as a countermeasure of the second-order DPA, and applies a transform to at least one of data of random numbers for use in the mask and intermediate data under encryption processing.

In the second embodiment, functions of the first transform units, the registers, and the second transform units are different from those of the first embodiment. Other functions of the processors (the input unit 110a, the output unit 110b, the key storage unit 101, the round key generation unit 102, the AddRoundKey 105a, a round function 103, and the round function 104 in FIG. 1) are the same as those of the first embodiment. The overall process of encryption processing is also the same as that of FIG. 4. In view of this, functions of the first transform units, the registers, and the second transform units according to the second embodiment and processing executed by these processors will be described in detail below.

Figure 9:
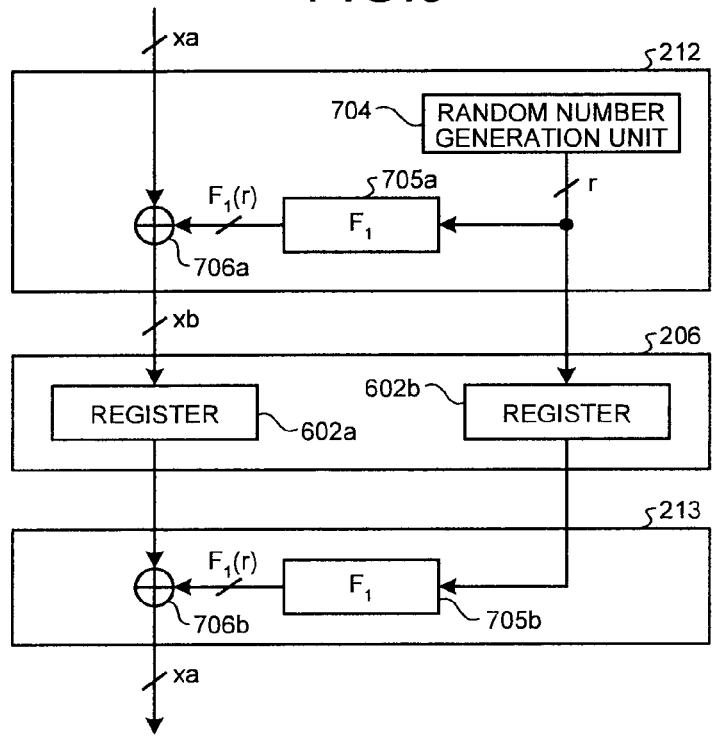
FIG. 9 is a block diagram of a first transform unit, a register, and a second transform unit according to a second embodiment.

FIG. 9 is a block diagram illustrating exemplary configurations of a first transform unit 212, a register 206, and a second transform unit 213 according to the second embodiment. While an eight-bit processing unit will be described below as a processing unit similarly to that of FIG. 7, a processing unit other than the eight-bit processing unit may be applied to the same configuration.

The first transform unit 212 receives eight-bit data xa under encryption processing, and outputs eight-bit data xb, which is the transformed data xa, and an eight-bit random number r. The first transform unit 212 includes a random number generation unit 704, a function operator 705a, an exclusive OR operation unit 706a.

The random number generation unit 704 generates the eight-bit random number r. The function operator 705a transforms the generated random number into a transformed random number with a predetermined transform processing (first transform processing). For example, the function operator 705a operates a transformed random number $F_1(r)$, which is transformed from the random number r using a function $F_1$. The function F transforms eight-bit input data into eight-bit output data. The exclusive OR operation unit 706a operates an exclusive OR of the $F_1(r)$ and the data xa so as to mask the data xa with the transformed random number $F_1(r)$, and outputs the transformed data xb as a processing result.

The register 206 stores the data xb, which is output from the first transform unit 212, and the random number r. The register 206 includes two registers of the register 602a and register 602b. While the register 602a stores the transformed data xb, the register 602b stores the random number r before the transform.

The second transform unit 213 receives the eight-bit data xb and the eight-bit random number r, which are stored in the register 206. The second transform unit 213 transforms the received data into the eight-bit data xa, and outputs the data xa. The second transform unit 213 includes a function operator 705b and an exclusive OR operation unit 706b.

The function operator 705b operates the transformed random number $F_1(r)$, which is transformed from the random number r stored in the register 602b using the function $F_1$. The function F transforms eight-bit input data into eight-bit output data. The exclusive OR operation unit 706b operates an exclusive OR of the $F_1(r)$ and the transformed data xb so as to release the mask using the transformed random number $F_1(r)$, and outputs the intermediate data xa as a processing result.

The function $F_1$, which is used by the function operator 705a and the function operator 705b, may employ a function expressed by the following expression (14).

$$F(x) = \begin{pmatrix} 1 & 0 & 0 & 0 & 0 & 1 & 1 & 1 \\ 1 & 1 & 0 & 0 & 0 & 0 & 1 & 1 \\ 1 & 1 & 1 & 0 & 0 & 0 & 0 & 1 \\ 1 & 1 & 1 & 1 & 0 & 0 & 0 & 0 \\ 0 & 1 & 1 & 1 & 1 & 0 & 0 & 0 \\ 0 & 0 & 1 & 1 & 1 & 1 & 0 & 0 \\ 0 & 0 & 0 & 1 & 1 & 1 & 1 & 0 \\ 0 & 0 & 0 & 0 & 1 & 1 & 1 & 1 \end{pmatrix} x \quad (14)$$

The function $F_1$ is not limited to this, and may be a function using nonlinear transforms such as a hash function, a linear feedback shift register, and an S-box.

The random number generation unit 704 may be arranged outside the first transform unit 212. In this case, the first transform unit 212 receives the eight-bit data xa under the encryption processing and the random number r, which is generated by the random number generation unit 704. The first transform unit 212 calculates the eight-bit data xa, and outputs the calculated data xa along with the random number r.

Figure 10:
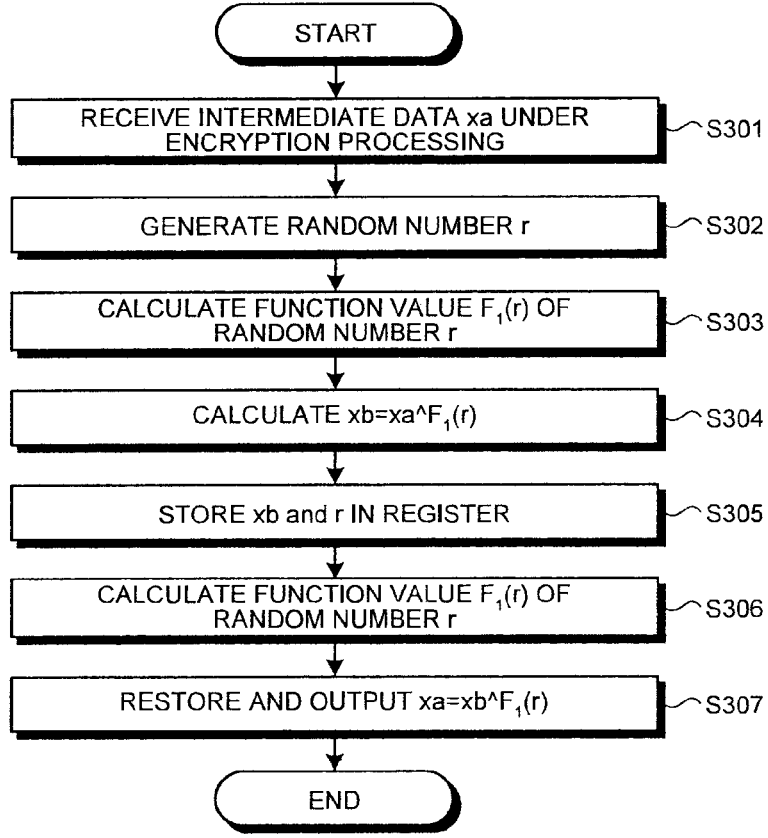
FIG. 10 is a flowchart illustrating an overall flow of data transform processing according to the second embodiment.

Next, data transform processing that is performed by the first transform unit 212, the register 206, and the second transform unit 213 according to the second embodiment thus configured will be described by referring to FIG. 10. FIG. 10 is a flowchart illustrating an overall flow of the data transform processing according to the second embodiment.

First, the first transform unit 212 receives the intermediate data xa under the encryption processing (step S301). Next, the random number generation unit 704 generates the random number r (step S302). The function operator 705a transforms the random number r into the $F_1(r)$ using the function $F_1$ (step S303). The exclusive OR operation unit 706a calculates the exclusive OR of the intermediate data xa under the encryption processing and the $F_1(r)$, which is output from the function operator 705a. The exclusive OR is expressed by xb=xa^$F_1(r)$ (where ^ means exclusive OR). The exclusive OR operation unit 706a then outputs a calculation result of the transformed data xb and the random number r (step S304). The register 206 stores the transformed data xb in the register 602a, and stores the random number r in the register 602b (step S305). The function operator 705b of the second transform unit 213 transforms the random number r, which is stored in the register 602b, into the $F_1(r)$ using the function $F_1$ (step S306).

The exclusive OR operation unit 706b calculates the exclusive OR of the data xb, which is stored in the register 602a and the $F_1(r)$, which is output from the function operator 705b. The exclusive OR is expressed by xa=xb^$F_1(r)$. The exclusive OR operation unit 706b outputs the calculation result of the intermediate data xa (step S307).

With the processing, the data (the $F_1(r)$) that is transformed from the random number r with the function $F_1$ is used as the mask, and the register 206 stores the masked intermediate data (the transformed data xb). This eliminates the correlation between the intermediate data xa and the power consumption. Accordingly, this ensures resistance against power analysis such as the DPA. The register 206 stores the masked intermediate data (the transformed data xb) and the random number (r) before the transform. Thus, the masked intermediate data and the mask do not affect the power consumption at the same time. This ensures resistance against the ZO-2DPA.

Figure 11:
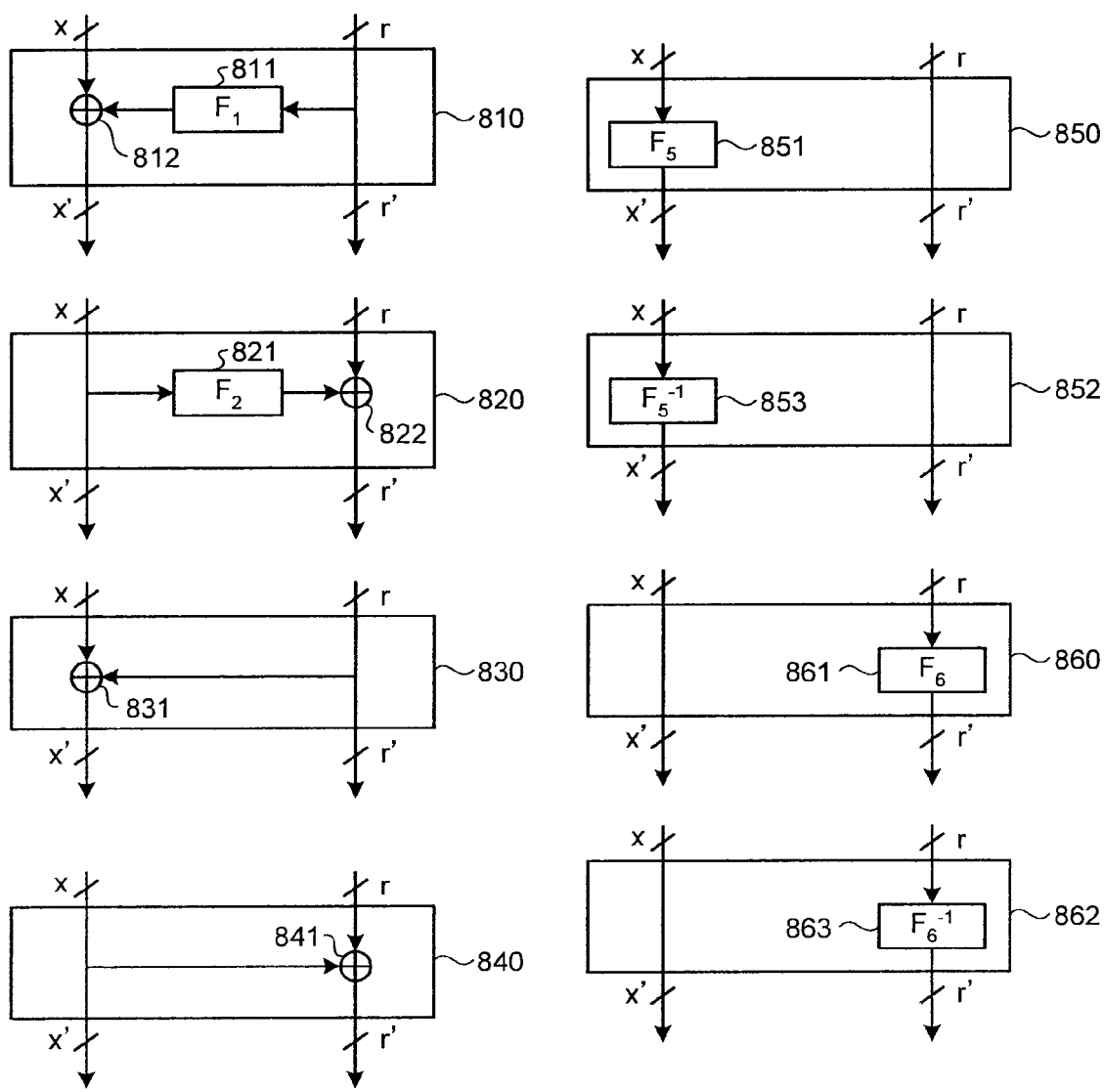
FIG. 11 is a block diagram illustrating exemplary transform processors.

The configurations of the first transform unit 212 and the second transform unit 213 in FIG. 9 are generalized as follows. The configurations will be described by referring to FIG. 11. FIG. 11 is a block diagram illustrating exemplary transform processors, which are applicable to at least a part of configuration of the first transform unit 212 and the second transform unit 213.

The first transform unit 212 may employ a configuration that includes at least one of the transform processors in a group of the transform processors (transform processors 810, 820, 830, 840, 850, and 860) in FIG. 11 that are arranged in any order. The first transform unit 212 includes a random number generation unit that generates a random number, in addition to the transform processors. The random number is output to a transform processor that is arranged in the first position.

The second transform unit 213 includes at least one of the transform processors 810, 820, 830, 840, 852, and 862 that are each arranged in an inverse order with respect to the corresponding transform processor of the first transform unit 212. At this time, in the case where the transform processors 850 and 860 are arranged in the first transform unit 212, the transform processors 852 and 862 are each arranged in a corresponding position at the second transform unit 213. In the case where the transform processors in the first transform unit 212 and the second transform unit 213 are symmetrically provided with respect to the register 206, the intermediate data under encryption processing is decrypted.

For example, in the case where the transform processors of the first transform unit 212 are arranged in order of the transform processors 810, 850, and 860 toward the register 206, the transform processors of the second transform unit 213 are arranged in order of the transform processors 862, 852, and 810 from the register 206.

To add a mask using a random number, the first transform unit 212 is required to include at least one of the transform processor 810 and the first transform unit 830. The transform processor 830 alone cannot avoid an attack by the ZO-2DPA. Thus, the first transform unit 212 is required to include at least one of other transform processors that perform processing to transform a random number into a transformed random number and processing to transform intermediate data using the transformed random number.

Here, respective transform processors in FIG. 11 will be described in detail. The transform processor 810 includes a function operator 811 and an exclusive OR operation unit 812. The transform processor 820 includes a function operator 821 and an exclusive OR operation unit 822. The transform processor 830 includes an exclusive OR operation unit 831. The transform processor 840 includes an exclusive OR operation unit 841. The transform processor 850 includes a function operator 851. The transform processor 852 includes a function operator 853. The transform processor 860 includes a function operator 861. The transform processor 862 includes a function operator 863.

The $F_1$ and $F_2$, which are calculated in the function operator 811 and 821, employ, for example, a transform using a feedback shift register, a linear transform, a nonlinear transform such as an S-box. The $F_5$ and $F_6$, which are calculated in the function operator 851 and 861, employ functions including inverse functions $F_5^{-1}$ and $F_6^{-1}$. For example, the functions F expressed by expressions (1) to (4), which are described in the first embodiment, are used.

Next, processing procedures of the respective transform processors 810, 820, 830, 840, 850, 852, 860, and 862 will be described. The transform processor 810 receives data x and r, and outputs respective data x', which is equal to x^$F_1(r)$, and data r', which is equal to the data r.

The function operator 811 receives data r, and outputs the function value $F_1(r)$. The exclusive OR operation unit 812 outputs an exclusive OR of data x and the function value $F_1(r)$, which is output from the function operator 811. The exclusive OR is expressed by x^$F_1(r)$.

The transform processor 820 receives data x and r. The transform processor 820 then outputs data x', which is equal to the data x, and data r', which is equal to r^$F_2(x)$. The function operator 821 receives the data x, and outputs the function value $F_2(x)$. The exclusive OR operation unit 822 outputs an exclusive OR of data r and the function value $F_2(x)$, which is output from the function operator 821. The exclusive OR is expressed by r^$F_2(x)$.

The transform processor 830 receives data x and r. The transform processor 830 then outputs data x', which is equal to x^r, and data r', which is equal to the data r. The exclusive OR operation unit 831 outputs an exclusive OR, which is expressed by r^x, of the data r and the data x.

The transform processor 840 receives pieces of data x and r. The transform processor 840 then outputs data x', which is equal to the data x, and data r', which is equal to r^x. The exclusive OR operation unit 841 outputs exclusive OR, which is expressed by x^r, of the data x and the data r.

The transform processor 850 receives data x and r. The transform processor 850 then outputs data x', which is equal to a function value $F_5(x)$, and data r', which is equal to the data r. The function operator 851 receives the data x, and outputs the function value $F_5(x)$.

The transform processor 852 receives data x and r. The transform processor 852 then outputs data x', which is equal to a function value $F_5^{-1}(x)$, and data r', which is equal to the data r. The function operator 853 receives the data x, and outputs the function value $F_5^{-1}(x)$.

The transform processor 860 receives data x and r. The transform processor 860 then outputs data x', which is equal to the data x, and data r', which is equal to a function value $F_6(r)$. The function operator 861 receives the data r, and outputs the function value $F_6(r)$.

The transform processor 862 receives data x and r. The transform processor 862 then outputs data x', which is equal to the data x, and data r', which is equal to a function value $F_6^{-1}(r)$. The function operator 863 receives the data r, and outputs the function value $F_6^{-1}(r)$.

It is recommended that the function operators 811, 821, 851, and 861 employ functions that output different data depending on inputs.

The exclusive OR operation units 812, 822, 831, and 841 may use, for example, addition modulo 256 assuming that eight-bit data is an integer from 0 to 255 instead of exclusive OR. At this time, if a transform processor of the first transform unit 212 performs addition, a corresponding transform processor of the second transform unit 213 performs subtraction. If the transform processor of the first transform unit 212 performs subtraction, the corresponding transform processor of the second transform unit 213 performs addition.

Here, a method for configuring the first transform unit 212 and the second transform unit 213 illustrated in FIG. 9 using elements in FIG. 11 will be described. The first transform unit 212 includes the random number generation unit 704 and the transform processor 810, which receives the data x under the encryption processing and the random number r. The second transform unit 213 includes the transform processor 810. In the transform processor 810, the data x is output from the register 602a, and the data r is output from the register 602b.

Modification

Figure 12:
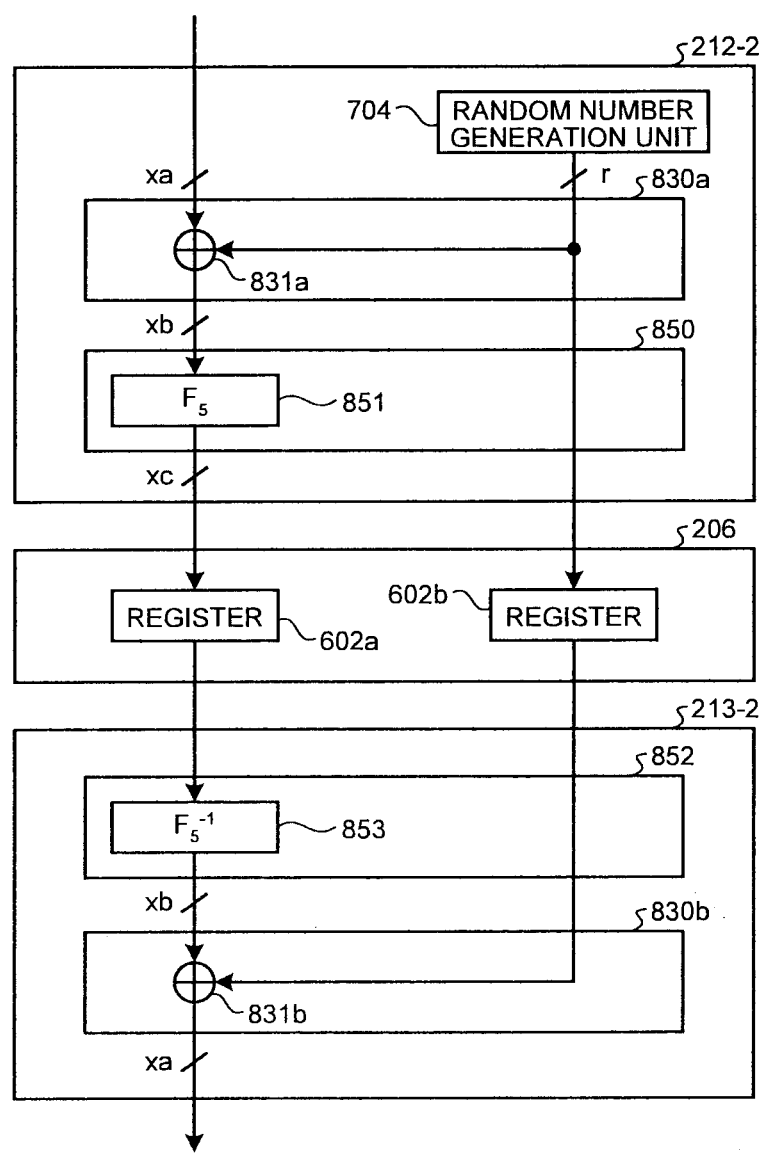
FIG. 12 is a block diagram illustrating a first transform unit and a second transform unit according to a modification of the second embodiment.

A modification with elements in FIG. 11 of the first transform unit 212 and the second transform unit 213 will be described by referring to FIG. 12. FIG. 12 is a block diagram illustrating exemplary configurations of a first transform unit 212-2 and a second transform unit 213-2 according to the modification of the second embodiment.

The first transform unit 212-2 includes the random number generation unit 704, a transform processor 830a, and the transform processor 850. The transform processor 830a includes an exclusive OR operation unit 831a. The transform processor 850 includes the function operator 851. The second transform unit 213-2 includes the transform processor 852 and the transform processor 830b. The transform processor 852 includes the function operator 853. The transform processor 830b includes an exclusive OR operation unit 831b.

The first transform unit 212-2 receives eight-bit data xa under encryption processing. The first transform unit 212-2 transforms the data xa into eight-bit data xb at the transform processor 830a, and transforms the data xb to data xc at the transform processor 850. The first transform unit 212-2 then outputs the data xc and the data r. The register 206 stores the data xc, which is output from the first transform unit 212-2, in the register 602a. The register 206 stores the data r in the register 602b. The second transform unit 213-2 receives the data xc and data r, which are stored in the register 206. The second transform unit 213-2 transforms the data xc into the data xb at the transform processor 852, and transforms the data xb into the eight-bit data xa at the transform processor 852. The second transform unit 213-2 then outputs the data xa.

The transform processor 830a calculates an exclusive OR of the data xa and the data r at the exclusive OR operation unit 831a. The transform processor 830a then outputs the data xb and r as calculation results. The transform processor 850 processes the data xb at the function operator 851, and outputs the data xc and r as calculation results. The function $F_5$ used in the function operator 851 is assumed to have the inverse function $F_5^{-1}$. The transform processor 852 calculates the input data xc at the function operator 853. The transform processor 852 then outputs the data xb and r as calculation results. The function used in the function operator 853 is assumed to be the inverse function $F_5^{-1}$ for the function $F_5$ used in the function operator 851. The transform processor 830b calculates an exclusive OR of the data xb and the data r at the exclusive OR operation unit 831b, and then outputs the data xa as a calculation result.

Figure 13:
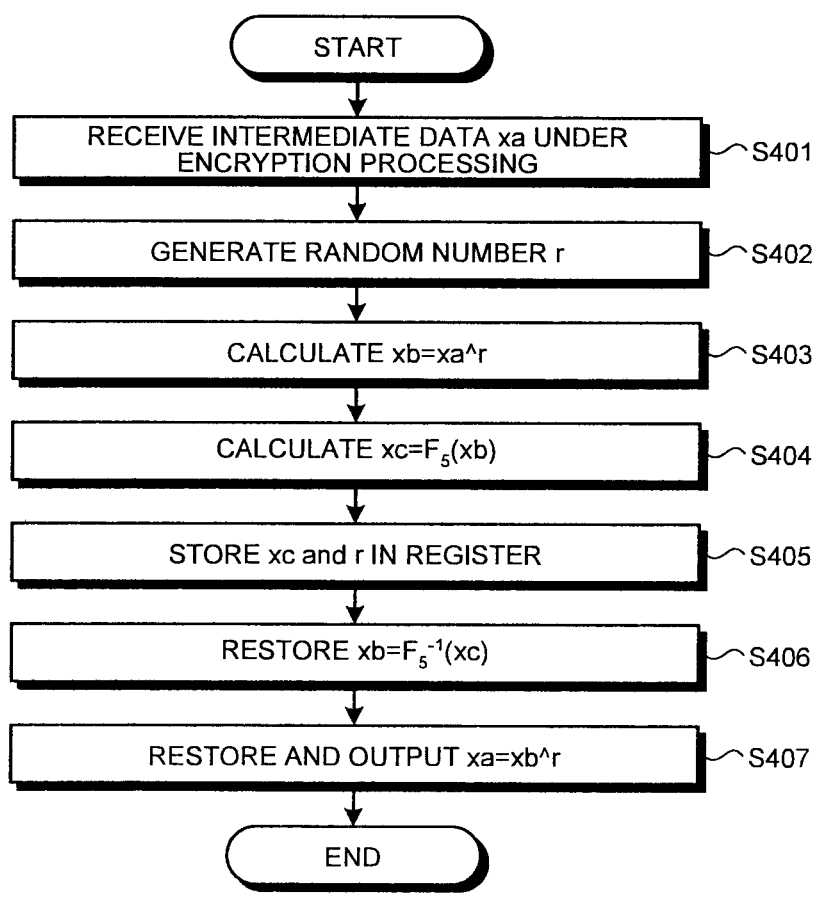
FIG. 13 is a flowchart illustrating an overall flow of data transform processing according to the modification of the second embodiment.

Next, data transform processing of the first transform unit 212-2, the register 206, and the second transform unit 213-2 according to the modification of the second embodiment thus configured will be described by referring to FIG. 13. FIG. 13 is a flowchart illustrating an overall flow of the data transform processing according to the modification of the second embodiment.

First, the first transform unit 212-2 receives the intermediate data xa under the encryption processing (step S401). The random number generation unit 704 generates the random number r and supplies it to the transform processor 830a (step S402). The exclusive OR operation unit 831a of the transform processor 830a calculates an exclusive OR, which is expressed by xb=xa^r, of the data xa and the random number r. The exclusive OR operation unit 831a then outputs the data xb and r (step S403). The function operator 851 of the transform processor 850 calculates the data xc, which is equal to $F_5(xb)$, using the data xb output from the exclusive OR operation unit 831a. The function operator 851 then outputs the data xc and r as calculation results to the register 206 (step S404).

The register 206 stores the data xc in the register 602a, and stores the data r in the register 602b (step S405).

In the second transform unit 213-2, the function operator 853 of the transform processor 852 decrypts the data xb, which is equal to $F_5^{-1}(xc)$, using the data xc stored in the register 206 (step S406). The function operator 853 outputs the data xb and r. The exclusive OR operation unit 831b of the transform processor 830b calculates an exclusive OR, which is expressed by xa=xb^r, of the data xb and the random number r, and then output the exclusive OR (step S407).

The modification also has resistance against power analysis such as the DPA and the ZO-2DPA.

As described above, the encryption device according to the second embodiment transforms at least one of the masked data intermediate data and the mask to be stored in the register. Accordingly, when a clock is switched (a timing at which data is written to the register), the masked intermediate data and the mask do not affect the power consumption at the same time. This ensures resistance against power analysis including the ZO-2DPA.

Third Embodiment

An encryption device according to the third embodiment uses a plurality of random numbers as a mask. The third embodiment includes elements illustrated in FIG. 11.

In the third embodiment, only functions of the first transform unit, the register, and the second transform unit are different from those of the first and the second embodiments. In view of this, the functions of the first transform unit, the register, and the second transform unit according to the third embodiment will be described in detail below. Processing of these processors will also be described.

Figure 14:
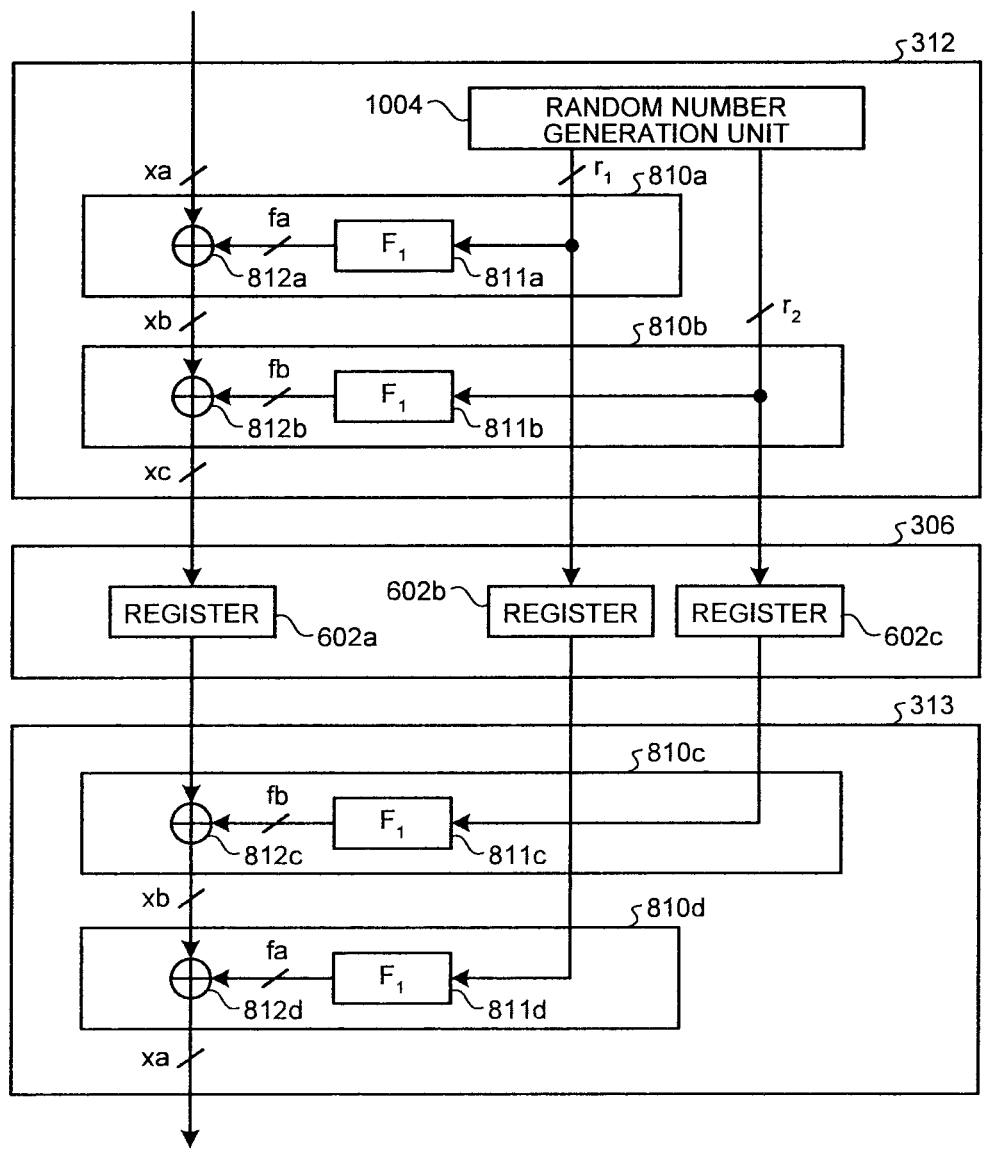
FIG. 14 is a block diagram of a first transform unit, a register, and a second transform unit according to a third embodiment.

FIG. 14 is a block diagram illustrating exemplary configurations of a first transform unit 312, a register 306, and a second transform unit 313 according to the third embodiment.

The first transform unit 312 includes a random number generation unit 1004, a transform processor 810a, and a transform processor 810b.

The random number generation unit 1004 generates two random numbers $r_1$ and $r_2$, and supplies the random numbers $r_1$ and $r_2$ to respective transform processors 810a and 810b. The transform processor 810a transforms eight-bit data xa into eight-bit data xb. The transform processor 810b transforms the data xb into data xc. The first transform unit 312 outputs the obtained data xc, $r_1$, and $r_2$.

The register 306 includes the register 602a, the register 602b, and a register 602c. The register 602a stores the data xc, which is output from the first transform unit 312. The register 602b stores the data $r_1$. The register 602c stores the data $r_2$.

The second transform unit 313 includes a transform processor 810c and a transform processor 810d. The second transform unit 313 receives the data xc, $r_1$, and $r_2$, which are stored in the register 306. The transform processor 810c decrypts the data xc into the data xb. The transform processor 810d decrypts the data xb into the data xa, and then outputs the data xa.

The transform processors 810a to 810d in the first transform unit 312 or the second transform unit 313 includes function operators 811a to 811d and exclusive OR operation units 812a to 812d. Hereinafter, functions of the transform processors 810a to 810d will be described.

The transform processor 810a receives the data xa and the random number $r_1$. The transform processor 810a calculates fa, which is equal to $F_1(r_1)$, using the function operator 811a. The transform processor 810a also calculates an exclusive OR, which is expressed by xb=xa^fa, using the exclusive OR operation unit 812a. The transform processor 810a outputs the data xb and $r_1$.

The transform processor 810b receives the data xb, which is output from the transform processor 810a, and the random number $r_2$. The transform processor 810b calculates fb, which is equal to the $F_1(r_2)$, using the function operator 811b. The transform processor 810b also calculates an exclusive OR, which is expressed by xc=xb^fb, using the exclusive OR operation unit 812b. The transform processor 810b outputs the data xc and $r_2$.

The transform processor 810c receives the data xc and data $r_2$, which are stored in the register 306. The transform processor 810c calculates fb, which is equal to the $F_1(r_2)$, using the function operator 811c. The transform processor 810c also calculates an exclusive OR, which is expressed by xb=xc^fb, using the exclusive OR operation unit 812c. The transform processor 810c outputs the data xb.

The transform processor 810d receives the data xb, which is output from the transform processor 810c, and the data $r_1$, which is stored in the register 306. The transform processor 810d calculates fa, which is equal to the $F_1(r_1)$, using the function operator 811d. The transform processor 810d also calculates an exclusive OR, which is expressed by xa=xb^fa, using the exclusive OR operation unit 812d. The transform processor 810d outputs the data xa.

The function operators 811a and 811d use the same function. The function operators 811b and 811c use the same function.

Figure 15:
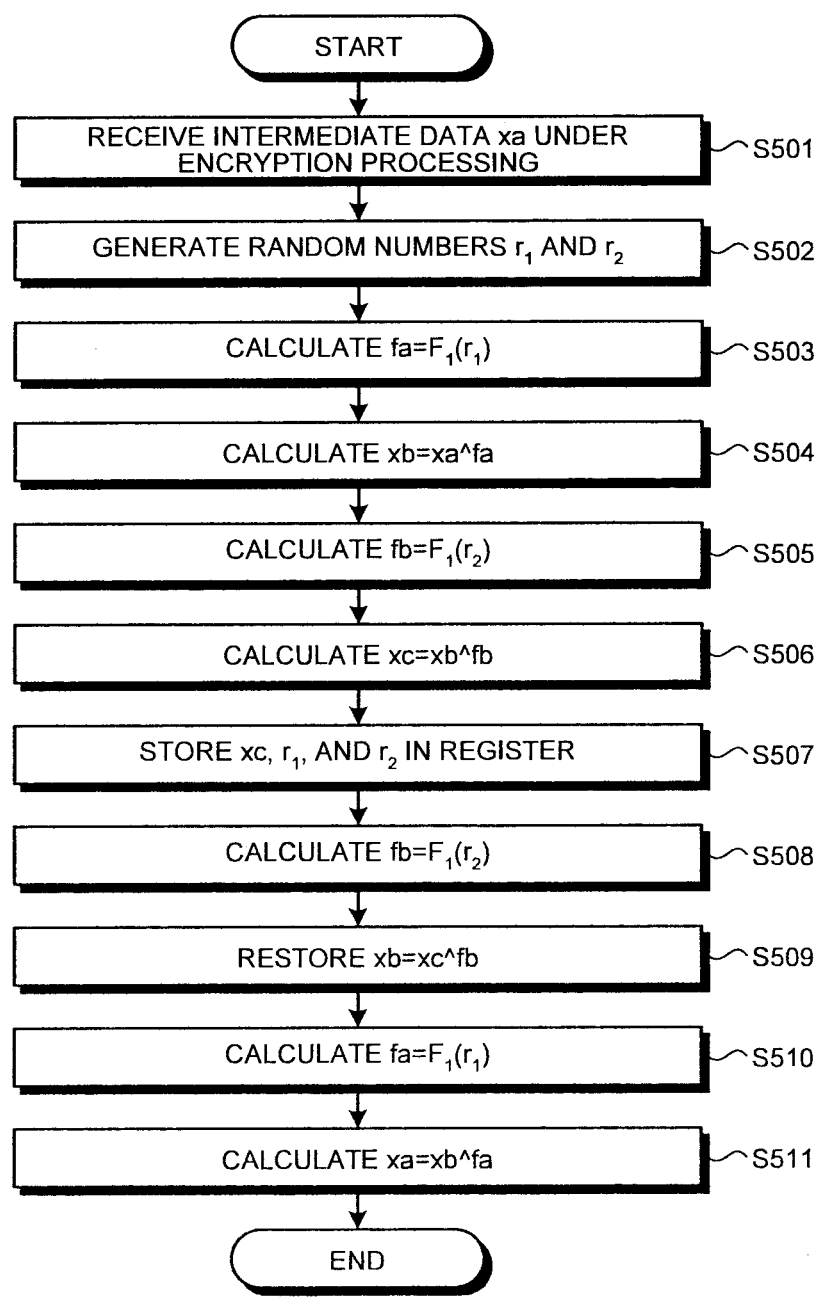
FIG. 15 is a flowchart illustrating an overall flow of data transform processing according to the third embodiment.

Next, data transform processing of the first transform unit 312, the register 306, and the second transform unit 313 according to the third embodiment thus configured will be described by referring to FIG. 15. FIG. 15 is a flowchart illustrating an overall flow of the data transform processing according to the third embodiment.

First, the first transform unit 312 receives the intermediate data xa under the encryption processing as input data (step S501). The random number generation unit 1004 generates the random numbers $r_1$ and $r_2$, and supplies the random numbers $r_1$ and $r_2$ to the respective transform processors 810a and 810b (step S502). The function operator 811a of the transform processor 810a calculates the fa, which is equal to the $F_1(r_1)$, using the random number $r_1$ (step S503). The exclusive OR operation unit 812a calculates an exclusive OR of the data xa and the data fa, which is output from the function operator 811a (step S504). The exclusive OR is expressed by xb=xa^fa. The exclusive OR operation unit 812a outputs the calculation result xb to the transform processor 810b, and outputs the data $r_1$ to the register 602b.

Next, the function operator 811b of the transform processor 810b calculates the fb, which is equal to the $F_1(r_2)$, using the random number $r_2$ (step S505). The exclusive OR operation unit 812b calculates an exclusive OR of the data xb, which is output from the transform processor 810a, and the data fb, which is output from the function operator 811b (step S506). The exclusive OR is expressed by xc=xb^fb. The exclusive OR operation unit 812b outputs the calculation result xc to the register 602a, and outputs the data $r_2$ to the register 602c.

Next, the register 306 stores the data xc, which is output from the first transform unit 312, in the register 602a. The register 306 stores the data $r_1$, which is output from the first transform unit 312, in the register 602b. The register 306 stores the data $r_2$, which is output from the first transform unit 312, in the register 602c (step S507).

In the second transform unit 313, the function operator 811c of the transform processor 810c calculates the fb, which is equal to the $F_1(r_2)$, using the data $r_2$ stored in the register 602c (step S508). The exclusive OR operation unit 812c calculates an exclusive OR of the data xc, which is stored in the register 602a, and the data fb, which is output from the function operator 811c. The exclusive OR is expressed by xb=xc^fb (step S509). The exclusive OR operation unit 812c then outputs the data xb to the transform processor 810d.

Next, the function operator 811d of the transform processor 810d calculates the fa, which is equal to the $F_1(r_1)$, using the data $r_1$ stored in the register 602b (step S510). The exclusive OR operation unit 812d calculates an exclusive OR of the data xb, which is output from the transform processor 810c, and the data fa, which is output from the function operator 811d. The exclusive OR is expressed by xa=xb^fa. The exclusive OR operation unit 812d then outputs the data xa (step S511).

The processing ensures resistance against power analysis such as the DPA and the ZO-2DPA, similarly to the second embodiment.

Modification

Figure 16:
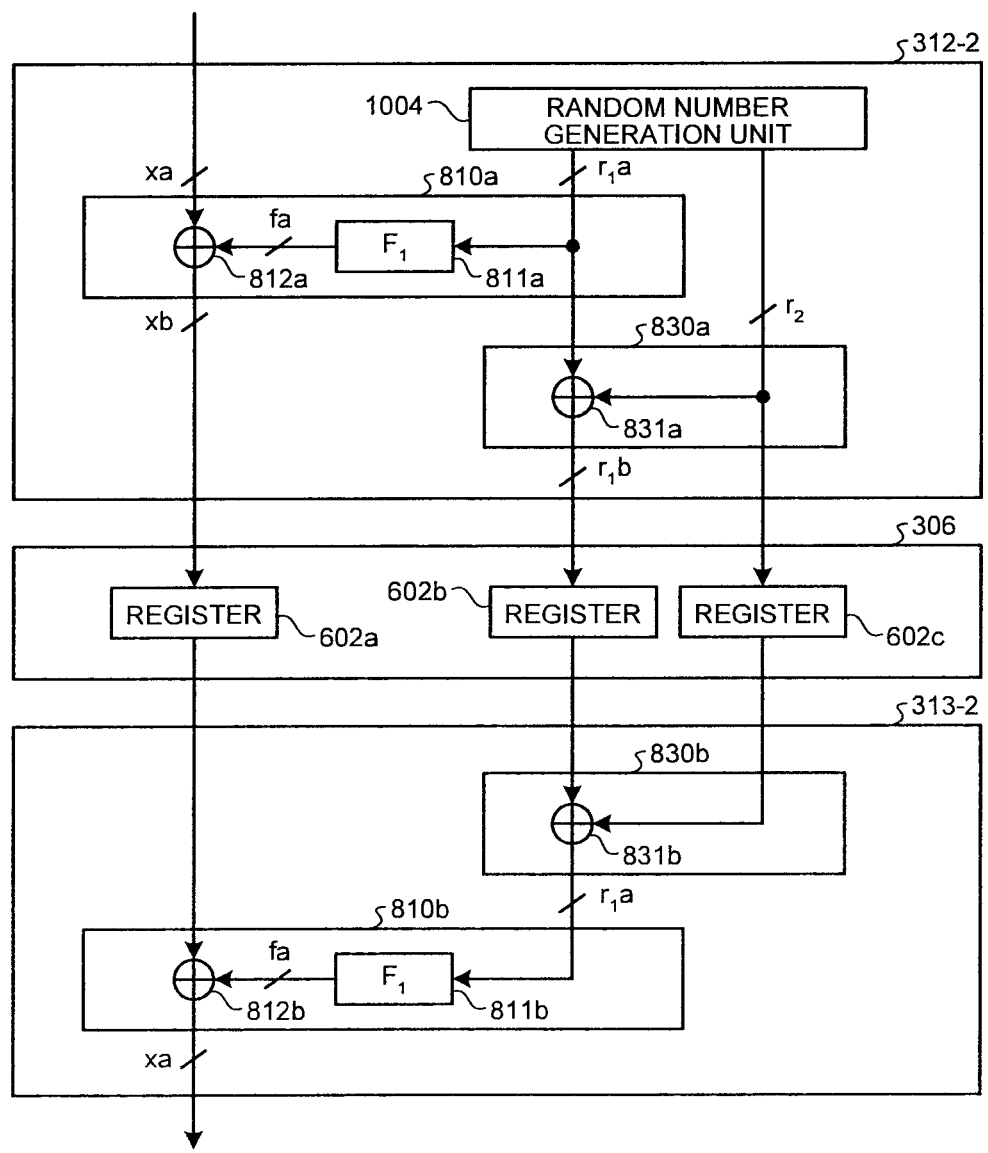
FIG. 16 is a block diagram illustrating a first transform unit, a register, and a second transform unit according to a modification of the third embodiment.

Next, a modification that stores a random number for a mask in a resister after being transformed by another random number will be described. FIG. 16 is a block diagram illustrating exemplary configurations of a first transform unit 312-2, a register 306, and a second transform unit 313-2 according to the modification of the third embodiment.

The first transform unit 312-2 includes a random number generation unit 1004, the transform processor 810a, and the transform processor 830a. The random number generation unit 1004 generates two random numbers $r_1a$ and $r_2$, and supplies the random numbers $r_1a$ and $r_2$ to the transform processors 810a and 830a. The transform processor 810a transforms eight-bit data xa into eight-bit data xb. The transform processor 830a transforms the data $r_1a$ into data $r_1b$. The first transform unit 312-2 then outputs the data xb, $r_1b$, and $r_2$.

The register 306 stores the data xb, which is output from the first transform unit 312-2, in the register 602a. The register 306 stores the data $r_1b$ in the register 602b, and stores the data $r_2$ in the register 602c.

The second transform unit 313-2 includes the transform processor 830b and the transform processor 810b. The second transform unit 313-2 receives the data xb, the data $r_1b$, and the data $r_2$, which are stored in the register 306. The transform processor 830b decrypts the data r1b into the data $r_1a$ using the data $r_2$. The transform processor 810b restores the data xa using the data xb and the data $r_1a$, and outputs the data xa.

The transform processor 810a includes the function operator 811a and the exclusive OR operation unit 812a. The transform processor 810b includes the function operator 811b and the exclusive OR operation unit 812b. The transform processors 830a and 830b respectively include the exclusive OR operation units 831a and 830b. Hereinafter, functions of the transform processors 810a, 810b, 830a, and 830b will be described.

The transform processor 810a receives the data xa under the encryption processing and the data $r_1a$, which is output from the random number generation unit 1004. The transform processor 810a calculates the fa, which is equal to the $F_1(r_1a)$ using the function operator 811a, and also calculates an exclusive OR expressed by xb=xa^fa using the exclusive OR operation unit 812a. The transform processor 810a outputs the data xb and $r_1a$.

The transform processor 830a receives the data $r_1a$, which is output from the transform processor 810a, and the random number $r_2$. The transform processor 830a calculates an exclusive OR expressed by $r_1b=r_1a\char r_2$ using the exclusive OR operation unit 831b. The transform processor 830a outputs the data $r_1b$ and $r_2$.

The transform processor 830b receives the data $r_1b$ and $r_2$, which are stored in the register 306. The transform processor 830b calculates an exclusive OR expressed by $r_1a=r_1b\char r_2$ using the exclusive OR operation unit 831b, and output the data $r_1a$.

The transform processor 810b receives the data $r_1a$, which is output from the transform processor 830b, and the data xb, which is stored in the register 306. The transform processor 810b calculates an exclusive OR, which is expressed by $fa=F_1(r_1a)$, using the function operator 811b. The transform processor 810b restores the data xa, which is equal to xb^fa, using the exclusive OR operation unit 812b. The transform processor 810b then outputs the data xa as a calculation result.

Figure 17:
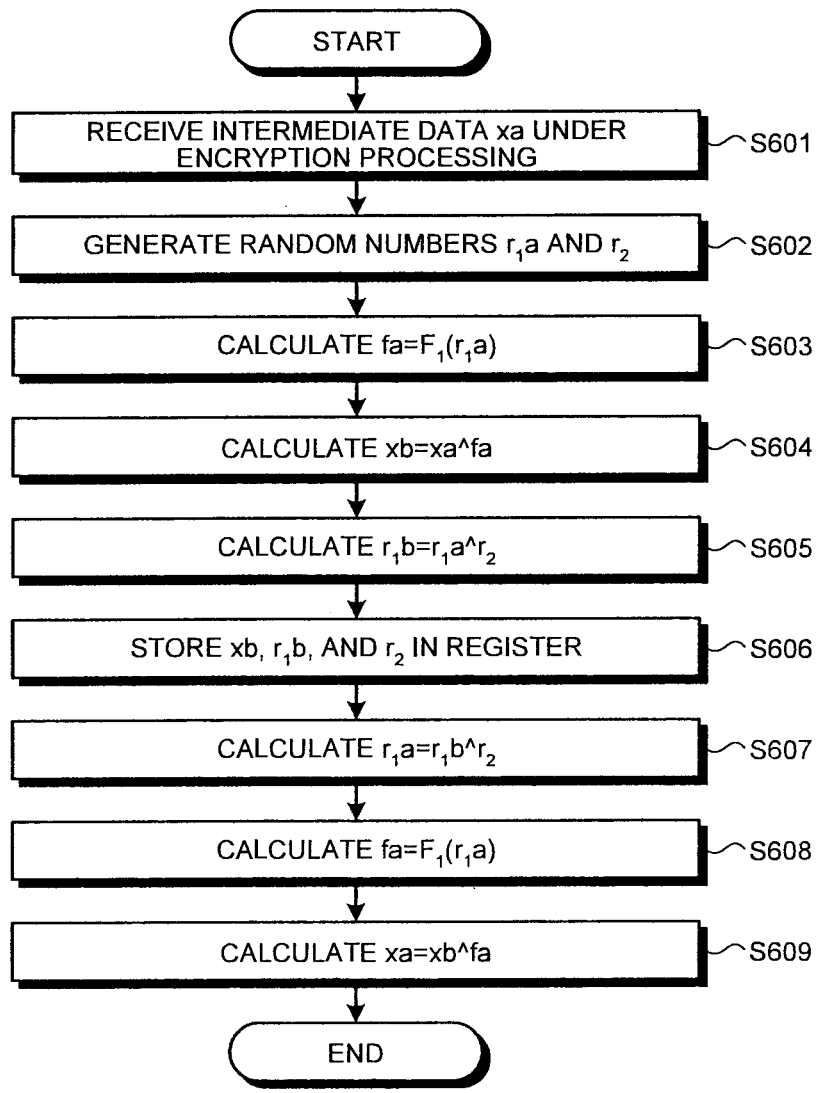
FIG. 17 is a flowchart illustrating an overall flow of data transform processing according to the modification of the third embodiment.

Next, data transform processing of the first transform unit 312-2, the register 306, and the second transform unit 313-2 according to the modification of the third embodiment thus configured will be described by referring to FIG. 17. FIG. 17 is a flowchart illustrating an overall flow of the data transform processing according to the modification of the third embodiment.

First, the first transform unit 312-2 receives the intermediate data xa under the encryption processing as input data (step S601). The random number generation unit 1004 generates the random numbers $r_1a$ and $r_2$, and supplies the random numbers $r_1a$ and $r_2$ to the transform processors 810a and 830a (step S602). The function operator 811a of the transform processor 810a calculates the function value fa of the random number $r_1a$ (step S603). The exclusive OR operation unit 812a calculates an exclusive OR of the data xa and the data fa, which is output from the function operator 811a (step S604). The exclusive OR is expressed by xb=xa^fa. The exclusive OR operation unit 812a outputs the calculation result xb to the register 602a, and outputs the data $r_1a$ to the transform processor 830a.

Next, in the transform processor 830a, the exclusive OR operation unit 831a calculates an exclusive OR of the data $r_1a$, which is output from the transform processor 810a, and the random number $r_2$ (step S605). The exclusive OR is expressed by $r_1b=r_1a\char r_2$. The exclusive OR operation unit 831a outputs the data $r_1b$ to the register 602b as the calculation result, and outputs the data $r_2$ to the register 602c.

Next, the register 306 stores the data xb, which is output from the first transform unit 312, in the register 602a. The register 306 stores the data $r_1b$, which is output from the first transform unit 312-2, in the register 602b. The register 306 stores the data $r_2$, which is output from the first transform unit 312-2, in the register 602c (step S606).

In the second transform unit 313-2, the exclusive OR operation unit 831b of the transform processor 830b calculates an exclusive OR of the data $r_1b$, which is stored in the register 602b, and the data $r_2$, which is stored in the register 602c (step S607). The exclusive OR is expressed by $r_1a=r_1b\char r_2$. The exclusive OR operation unit 831b outputs the data $r_1a$ to the transform processor 810a. Next, the function operator 811b of the transform processor 810b calculates the function value fa of the data $r_1a$, which is output from the transform processor 830b (step S608). The exclusive OR operation unit 812b calculates an exclusive OR of the data xb, which is stored in the register 602a, and the data fa, which is output from the function operator 811b. The exclusive OR is expressed by xa=xb^fa. The exclusive OR operation unit 812b then output the data xa (step S609).

In the configuration of FIG. 14, at least two steps of processing by the transform processors 810a and 810b are required for the input data xa. In contrast, in the configuration of the modification in FIG. 16, only one step of processing is required for the data xa by the transform processor 810a. Accordingly, for example, executing the one step of processing in parallel with another step of processing allows to reduce the processing time, compared with the configuration in FIG. 14.

Thus, the encryption device according to the third embodiment ensures resistance against power analysis such as the DPA and the ZO-2DPA, similarly to the second embodiment.

Fourth Embodiment

In each embodiment above, the described examples include the transforms of the first transform unit and the transforms of the second transform unit that are arranged symmetrical with respect to the center of the register. On the other hand, if the functions used for the transforms are limited to homomorphisms, the positions of the transform processors of the first transform unit and the positions of the transform processors of the second transform unit are not necessarily arranged symmetrical to one another. An encryption device according to the fourth embodiment employs homomorphisms as functions used for transforms and does not arrange transform processors in symmetrical positions. This will be described as an example.

In the fourth embodiment, only functions of the first transform unit, the register, and the second transform unit are different from those of the first to third embodiments. Therefore, the functions of the first transform unit, the register, and the second transform unit according to the fourth embodiment and steps of processing of these processors will be described in detail below.

Figure 18:
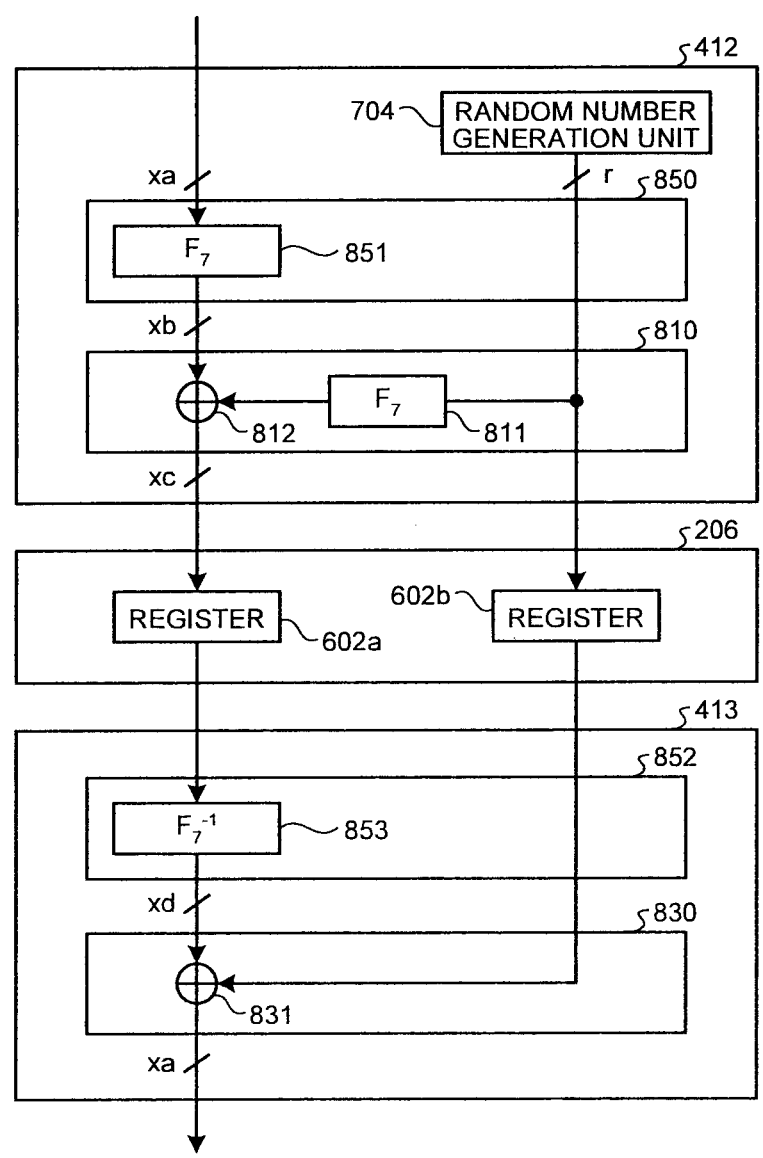
FIG. 18 is a block diagram illustrating a first transform unit and a second transform unit according to a fourth embodiment.

FIG. 18 is a block diagram illustrating exemplary configurations of a first transform unit 412 and a second transform unit 413 according to the fourth embodiment.

The first transform unit 412 includes the random number generation unit 704, the transform processor 850, and the transform processor 810. The transform processor 850 includes the function operator 851. The transform processor 810 includes the function operator 811 and the exclusive OR operation unit 812.

The first transform unit 412 receives the data xa under encryption processing. The random number generation unit 704 generates the random number r, and supplies the random number r to the transform processor 850. The transform processor 850 transforms the eight-bit data xa into the data xb. The transform processor 810 transforms the data xb into the data xc, and outputs the data xc and r.

The register 206 stores the data xc, which is output from the first transform unit 412, in the register 602a, and stores the data r in the register 602b.

The second transform unit 413 includes the transform processor 852 and the transform processor 830. The transform processor 852 includes the function operator 853. The transform processor 830 includes the exclusive OR operation unit 831.

The second transform unit 413 receives the data xc and r, which are stored in the register 206. The transform processor 852 transforms the data xc into the data xd. The transform processor 830 decrypts the data xd into the data xa, and outputs the data xa.

Hereinafter, functions of the transform processor 850, 810, 852, and 830 will be described. The transform processor 850 calculates the input data xa using the function operator 851, and outputs the calculation result xb and the data r.

The transform processor 810 receives the data xb under the encryption processing and the random number r, which is generated by the random number generation unit 704. The transform processor 810 calculates the function value f of the data r using the function operator 811, and calculates an exclusive OR xc of the data xb and the data f using the exclusive OR operation unit 812. The transform processor 810 then outputs the data xc and r.

The transform processor 852 processes the input data xc using the function operator 853, and outputs the calculation result xd.

The transform processor 830 calculates an exclusive OR of the data xd and the data r using the exclusive OR operation unit 831 to restore the data xa. The transform processor 830 then outputs the data xa.

The functions $F_7$ of the function operators 811 and 851 are homomorphisms that have inverse mappings. The functions $F_7$ of the function operators 811 and 851 are the same functions. The function of the function operator 853 is the inverse mapping $F_7^{-1}$ of the homomorphism $F_7$.

The function $F_7$ and the function $F_7^{-1}$ each employ a function expressed by for example, one of the following expressions (15) and (16). Here, the eight-bit data x is an argument of a function expressed in a matrix with eight rows and one column.

$$F(x) = \begin{pmatrix} 1 & 0 & 0 & 0 & 1 & 1 & 1 & 1 \\ 1 & 1 & 0 & 0 & 1 & 1 & 1 & 1 \\ 1 & 1 & 1 & 0 & 0 & 0 & 0 & 0 \\ 1 & 1 & 1 & 1 & 0 & 0 & 0 & 0 \\ 0 & 1 & 1 & 1 & 0 & 0 & 0 & 0 \\ 0 & 0 & 1 & 1 & 1 & 0 & 0 & 0 \\ 0 & 0 & 0 & 1 & 1 & 1 & 0 & 0 \\ 0 & 0 & 0 & 0 & 1 & 1 & 1 & 0 \end{pmatrix} x \quad (15)$$

$$F^{-1}(x) = \begin{pmatrix} 0 & 0 & 0 & 1 & 1 & 0 & 0 & 0 \\ 1 & 1 & 0 & 0 & 0 & 0 & 0 & 0 \\ 1 & 1 & 1 & 1 & 1 & 0 & 0 & 0 \\ 0 & 0 & 1 & 1 & 0 & 0 & 0 & 0 \\ 1 & 1 & 0 & 0 & 1 & 1 & 0 & 0 \\ 1 & 1 & 1 & 1 & 1 & 1 & 1 & 0 \\ 0 & 0 & 1 & 1 & 0 & 0 & 1 & 1 \\ 1 & 0 & 0 & 1 & 1 & 0 & 0 & 1 \end{pmatrix} x \quad (16)$$

Figure 19:
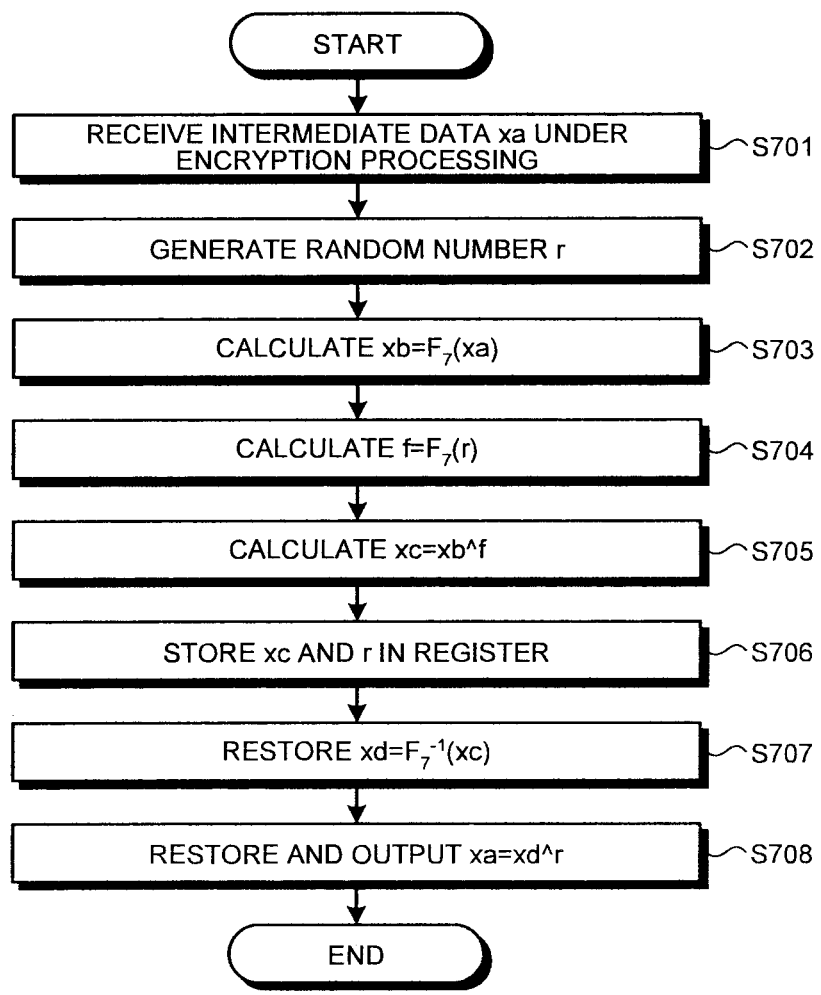
FIG. 19 is a flowchart illustrating an overall flow of data transform processing according to the fourth embodiment.

Next, data transform processing of the first transform unit 412, the register 206, and the second transform unit 413 according to the fourth embodiment thus configured will be described by referring to FIG. 19. FIG. 19 is a flowchart illustrating an overall flow of the data transform processing according to the fourth embodiment.

First, the first transform unit 412 receives intermediate data xa under the encryption processing as input data (step S701). The random number generation unit 704 generates the random number r, and supplies the random number r to the transform processor 850 (step S702). The function operator 851 of the transform processor 850 calculates the function value xb of the intermediate data xa under the encryption processing (step S703). The function operator 811 of the transform processor 810 calculates the function value f of the random number r, which is generated by the random number generation unit 704, using the function $F_7$ (step S704). The exclusive OR operation unit 812 calculates the exclusive OR of the data xb and the data f, which is output from the function operator 811 (step S705). The exclusive OR is expressed by xc=xb^f. The exclusive OR operation unit 812 then outputs the calculation result xc to the register 602a. The transform processor 810 outputs the data r to the register 602b.

Next, the register 206 stores the data xc, which is output from the first transform unit 412, in the register 602a. The register 206 stores the data r, which is output from the first transform unit 412, in the register 602b (step S706). In the second transform unit 413, the function operator 853 of the transform processor 852 calculates the function value xd of the data xc, which is stored in the register 206, using the function $F_7^{-1}$ (step S707). The function operator 853 outputs the calculation result xd and the data r to the transform processor 830.

Next, the exclusive OR operation unit 831 of the transform processor 830 calculates the exclusive OR of the data xd, which is output from the transform processor 852, and the data r so as to restore the data xa. The exclusive OR operation unit 831 then output the data xa (step S708).

A configuration using homomorphisms is not limited to the configuration in FIG. 18. Hereinafter, another example of the method for generating the first transform unit 412 and the second transform unit 413 using homomorphisms will be described. The first transform unit 412 and the second transform unit 413 can be generated by the following method with steps (1) to (4). For the first transform unit 412, one of a plurality of first transform units 412a, 412b, 412c and so on is selected. For the second transform unit 413, one of a plurality of second transform units 413a, 413b, 413c and so on is selected.

(1) The first transform unit 412a is generated by arranging the random number generation unit 704 and at least one of the transform processors 810, 820, 830, 840, 850, and 860 in FIG. 11 in any order.

Figure 20:
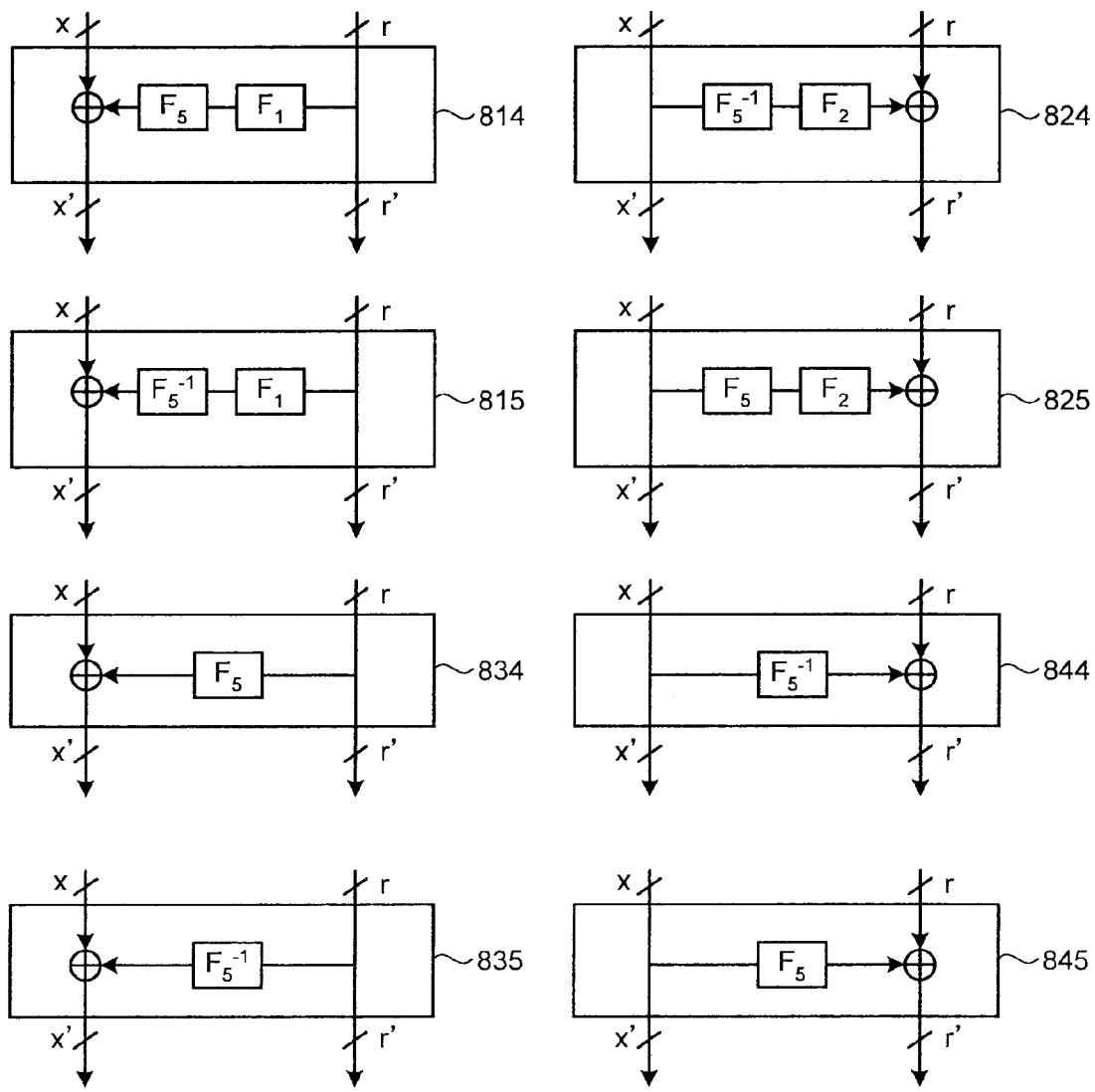
FIG. 20 is a block diagram illustrating exemplary transform processors.
Figure 21:
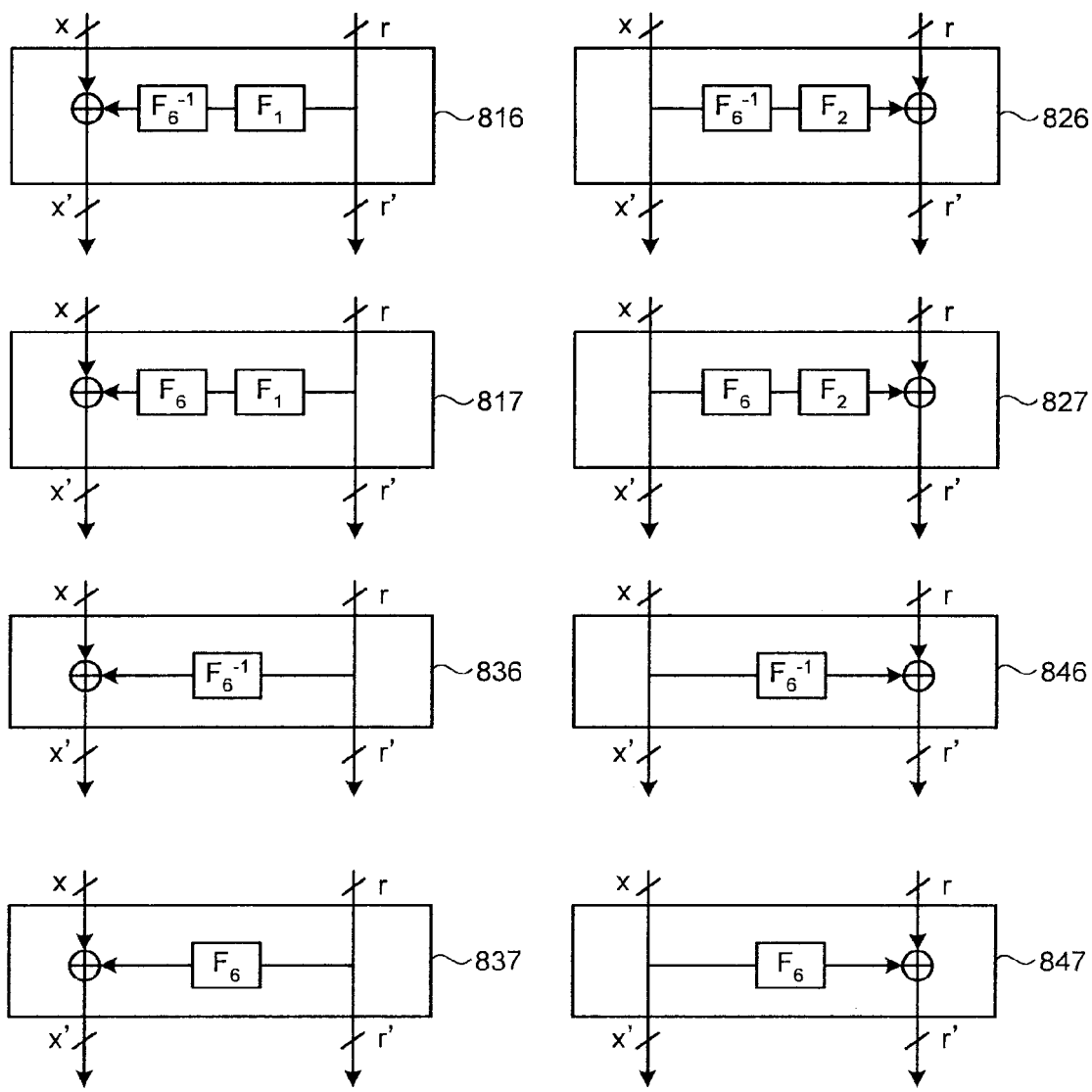
FIG. 21 is a block diagram illustrating exemplary transform processors.

(2) The first transform units 412b, 412c and so on, which receive the same input, are generated in accordance with the following replacement rules ((A-1) to (A-3), (B-1) to (B-8), and (C-1) to (C-8)). The functions $F_1$ to $F_6$ in FIG. 11, FIG. 20, and FIG. 21 are assumed to include the same homomorphisms F and their inverse mappings $F^{-1}$. FIG. 20 and FIG. 21 are block diagrams illustrating exemplary transform processors that are applicable to at least a part of elements in the first transform unit 412 and the second transform unit 413, in addition to the transform processors in FIG. 11.

(A-1) The sequentially arranged transform processor 810 and transform processor 830 may be replaced one another.
(A-2) The sequentially arranged transform processor 820 and transform processor 840 may be replaced one another.
(A-3) The sequentially arranged transform processor 850 and transform processor 860 may be replaced one another.
(B-1) When the transform processor 850 is moved to a position prior to the transform processor 810, which is in a position immediately prior to the transform processor 850, the transform processor 810 is replaced with the transform processor 814.

(B-2) When the transform processor 850 is moved to a position after the transform processor 810, which is in a position immediately after the transform processor 850, the transform processor 810 is replaced with the transform processor 815.

(B-3) When the transform processor 850 is moved to a position prior to the transform processor 820, which is in a position immediately prior to the transform processor 850, the transform processor 820 is replaced with the transform processor 824.

(B-4) When the transform processor 850 is moved to a position after the transform processor 820, which is in a position immediately after the transform processor 850, the transform processor 820 is replaced with the transform processor 825.

(B-5) When the transform processor 850 is moved to a position prior to the transform processor 830, which is in a position immediately prior to the transform processor 850, the transform processor 830 is replaced with the transform processor 834.

(B-6) When the transform processor 850 is moved to a position after the transform processor 830, which is in a position immediately after the transform processor 850, the transform processor 830 is replaced with the transform processor 835.

(B-7) When the transform processor 850 is moved to a position prior to the transform processor 840, which is in a position immediately prior to the transform processor 850, the transform processor 840 is replaced with the transform processor 844.

(B-8) When the transform processor 850 is moved to a position after the transform processor 840, which is in a position immediately after the transform processor 850, the transform processor 840 is replaced with the transform processor 845.

(C-1) When the transform processor 860 is moved to a position prior to the transform processor 810, which is in a position immediately prior to the transform processor 860, the transform processor 810 is replaced with the transform processor 816.

(C-2) When the transform processor 860 is moved to a position after the transform processor 810, which is in a position immediately after the transform processor 860, the transform processor 810 is replaced with the transform processor 817.

(C-3) When the transform processor 860 is moved to a position prior to the transform processor 820, which is in a position immediately prior to the transform processor 860, the transform processor 820 is replaced with the transform processor 826.

(C-4) When the transform processor 860 is moved to a position after the transform processor 820, which is in a position immediately after the transform processor 860, the transform processor 820 is replaced with the transform processor 827.

(C-5) When the transform processor 860 is moved to a position prior to the transform processor 830, which is in a position immediately prior to the transform processor 860, the transform processor 830 is replaced with the transform processor 836.

(C-6) When the transform processor 860 is moved to a position after the transform processor 830, which is in a position immediately after the transform processor 860, the transform processor 830 is replaced with the transform processor 837.

(C-7) When the transform processor 860 is moved to a position prior to the transform processor 840, which is in a position immediately prior to the transform processor 860, the transform processor 840 is replaced with the transform processor 846.

(C-8) When the transform processor 860 is moved to a position after the transform processor 840, which is in a position immediately after the transform processor 860, the transform processor 840 is replaced with the transform processor 847.

(3) The second transform units 413a, 413b, 413c and so on are each arranged in an inverse order with respect to the corresponding transform processors of the first transform units 412a, 412b, 412c and so on. At this time, in the case where the transform processor 850 and the transform processor 860 are arranged in the first transform units 412a, 412b, 412c and so on, the transform processor 852 and the transform processor 862 are each arranged in the corresponding position in the second transform units 413a, 413b, 413c and so on.

(4) For the first transform unit 412, one of the first transform units 412a, 412b, 412c and so on is selected. For the second transform unit 413, one of the second transform units 413a, 413b, 413c and so on is selected.

The first transform unit 412 and the second transform unit 413 in FIG. 18 illustrate examples thus generated.

As described above, the homomorphism F has the inverse mapping $F^{-1}$. For example, the homomorphism F employs the following function F(x) expressed by an expression (17). At this time, the inverse mapping $F^{-1}$ employs the following function $F^{-1}(x)$ expressed by an expression (18).

$$F(x)=Ax \tag{17}$$

$$F^{-1}(x)=A^{-1}x \tag{18}$$

Here, the eight-bit data x is an argument of a function expressed in a matrix with eight rows and one column. A matrix A is a matrix with eight rows and eight columns that has an inverse matrix $A^{-1}$. Any matrix may be selected as the matrix A. For example, the matrix A and the inverse matrix $A^{-1}$ employ matrices expressed by the following expressions (19) and (20).

$$A = \begin{pmatrix} 1 & 0 & 0 & 0 & 1 & 1 & 1 & 1 \\ 1 & 1 & 0 & 0 & 1 & 1 & 1 & 1 \\ 1 & 1 & 1 & 0 & 0 & 0 & 0 & 0 \\ 1 & 1 & 1 & 1 & 0 & 0 & 0 & 0 \\ 0 & 1 & 1 & 1 & 0 & 0 & 0 & 0 \\ 0 & 0 & 1 & 1 & 1 & 0 & 0 & 0 \\ 0 & 0 & 0 & 1 & 1 & 1 & 0 & 0 \\ 0 & 0 & 0 & 0 & 1 & 1 & 1 & 0 \end{pmatrix} \tag{19}$$

$$A^{-1} = \begin{pmatrix} 0 & 0 & 0 & 1 & 1 & 0 & 0 & 0 \\ 1 & 1 & 0 & 0 & 0 & 0 & 0 & 0 \\ 1 & 1 & 1 & 1 & 1 & 0 & 0 & 0 \\ 0 & 0 & 1 & 1 & 0 & 0 & 0 & 0 \\ 1 & 1 & 0 & 0 & 1 & 1 & 0 & 0 \\ 1 & 1 & 1 & 1 & 1 & 1 & 1 & 0 \\ 0 & 0 & 1 & 1 & 0 & 0 & 1 & 1 \\ 1 & 0 & 0 & 1 & 1 & 0 & 0 & 1 \end{pmatrix} \tag{20}$$

The encryption device according to the fourth embodiment thus configured employs the homomorphisms. Even in the case where the transforms before and after the register are not symmetrical to one another, this ensures resistance against power analysis such as the DPA and the ZO-2DPA. The unsymmetrical transform method prevents analysis on the transform method.

Fifth Embodiment

An encryption device according to the fifth embodiment is used for a data transform where one first transform unit and one second transform unit are respectively selected from a plurality of respective first transform units and a plurality of respective second transform units by the random number generation unit 704.

In the fifth embodiment, only functions of the first transform unit, the register, and the second transform unit are different from those of the first to the fourth embodiments. In view of this, the functions of the first transform unit, the register, and the second transform unit according to the fifth embodiment will be described in detail below. Processing of these processors will also be described.

Figure 22:
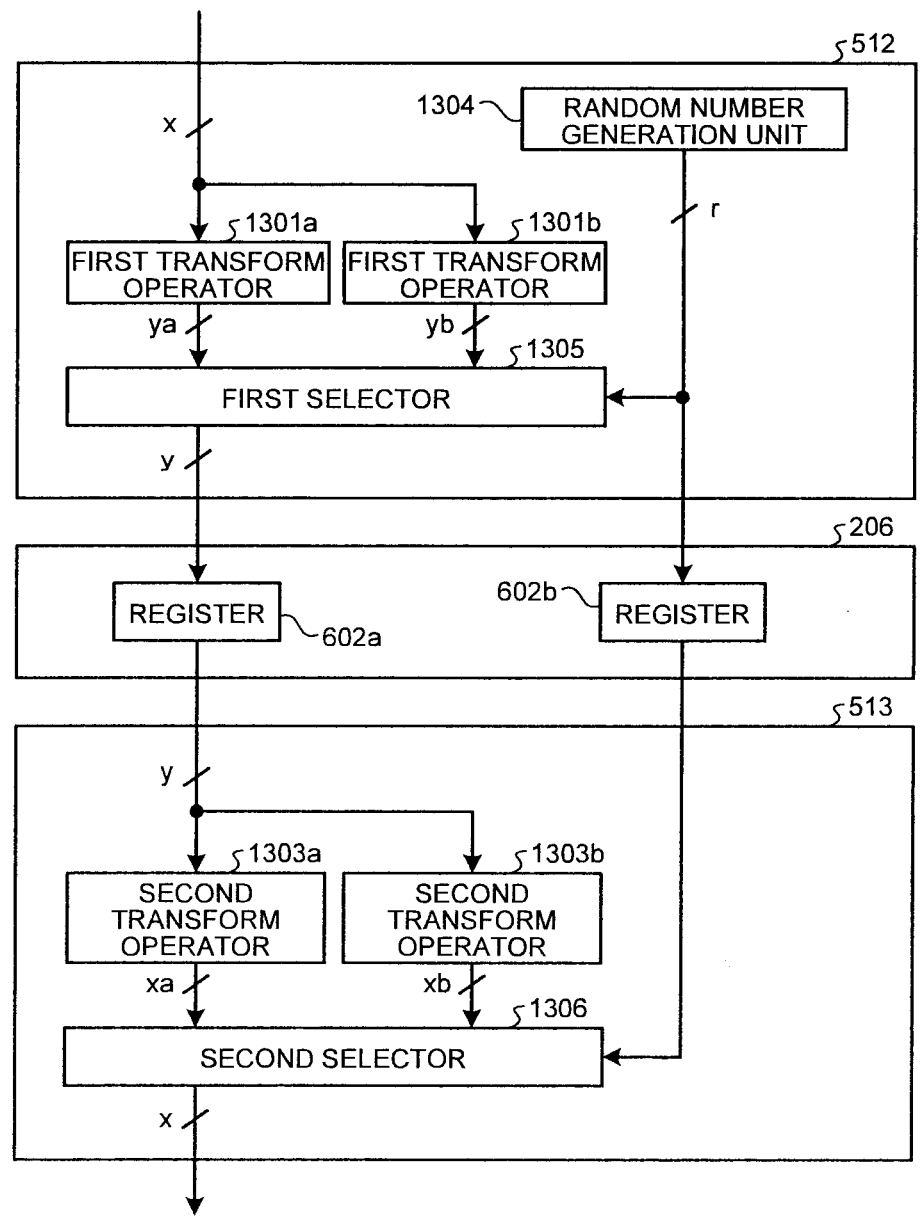
FIG. 22 is a block diagram illustrating a first transform unit and a second transform unit according to a fifth embodiment.

FIG. 22 is a block diagram illustrating exemplary configurations of a first transform unit 512 and a second transform unit 513 according to the fifth embodiment.

The first transform unit 512 includes a random number generation unit 1304, a plurality of first transform operators 1301*a* and 1301*b*, and a first selector 1305. The second transform unit 513 includes second transform operators 1303*a* and 1303*b* corresponding to the respective first transform operators 1301*a* and 1301*b*, and also includes a second selector 1306.

The first transform unit 512 may employ any of the first transform units described in the first to the fourth embodiments as the first transform operators 1301*a* and 1301*b*. The first transform operators 1301*a* and 1301*b* receive the data x under the encryption processing. The first transform operators 1301*a* and 1301*b* output data ya and data yb to the first selector 1305. The data ya and the data yb are each generated by connecting data that is transformed from the data x and data that is used for the transform (for example, the random number r).

The random number generation unit 1304 generates a random number r, which has a relationship expressed by $r(\in\{a, b\})$, as control data of the first selector 1305. The random number generation unit 1304 outputs the random number r to the first selector 1305 and the register 602*b*. The first selector 1305 selects one of the data ya and yb that are respectively output from the first transform operators 1301*a* and 1301*b* corresponding to the random number r, which is generated by the random number generation unit 1304. The first selector 1305 output the selected data, which is referred to as data y, to the register 602*a*. For example, the random number generation unit 1304 generates the random number r, which has relationship expressed by $r\in\{a, b\}$. The first selector 1305 selects the data ya if the value of the random number r is "a", while the first selector 1305 selects the data yb if the value of the random number r is "b".

The register 206 stores the data y, which is output from the first selector 1305, in the register 602*a*. The register 206 stores the random number r, which is generated by the random number generation unit 1304, in the register 602*b*.

The second transform unit 513 includes second transform operators 1303*a* and 1303*b* that perform inverse transform processing corresponding to transforms of the first transform operators 1301*a* and 1301*b*. The second transform operators 1303*a* and 1303*b* receive the data y, which is stored in the register 602*a*, and restore the data xa and the data xb from the data y. The second transform operators 1303*a* and 1303*b* respectively output the data xa and xb to the second selector 1306 as calculation results The second selector 1306 selects one of the data xa and the data xb, which are respectively output from the second transform operators 1303*a* and 1303*b*, with reference to the data r output from the register 602*b*. The second selector 1306 outputs the selected data (which is the data x).

The second selector 1306 is configured as follows. The second selector 1306 selects the data xa if the first selector 1305 selects the data ya, while the second selector 1306 selects the data xb if the first selector 1305 selects the data yb. For example, as described above, the random number generation unit 1304 generates the random number r, which has relationship expressed by $r\in\{a, b\}$. In this case, the second selector 1306 selects the data xa if the value of the random number r is "a", while the second selector 1306 selects the data xb if the value of the random number r is "b".

Figure 23:
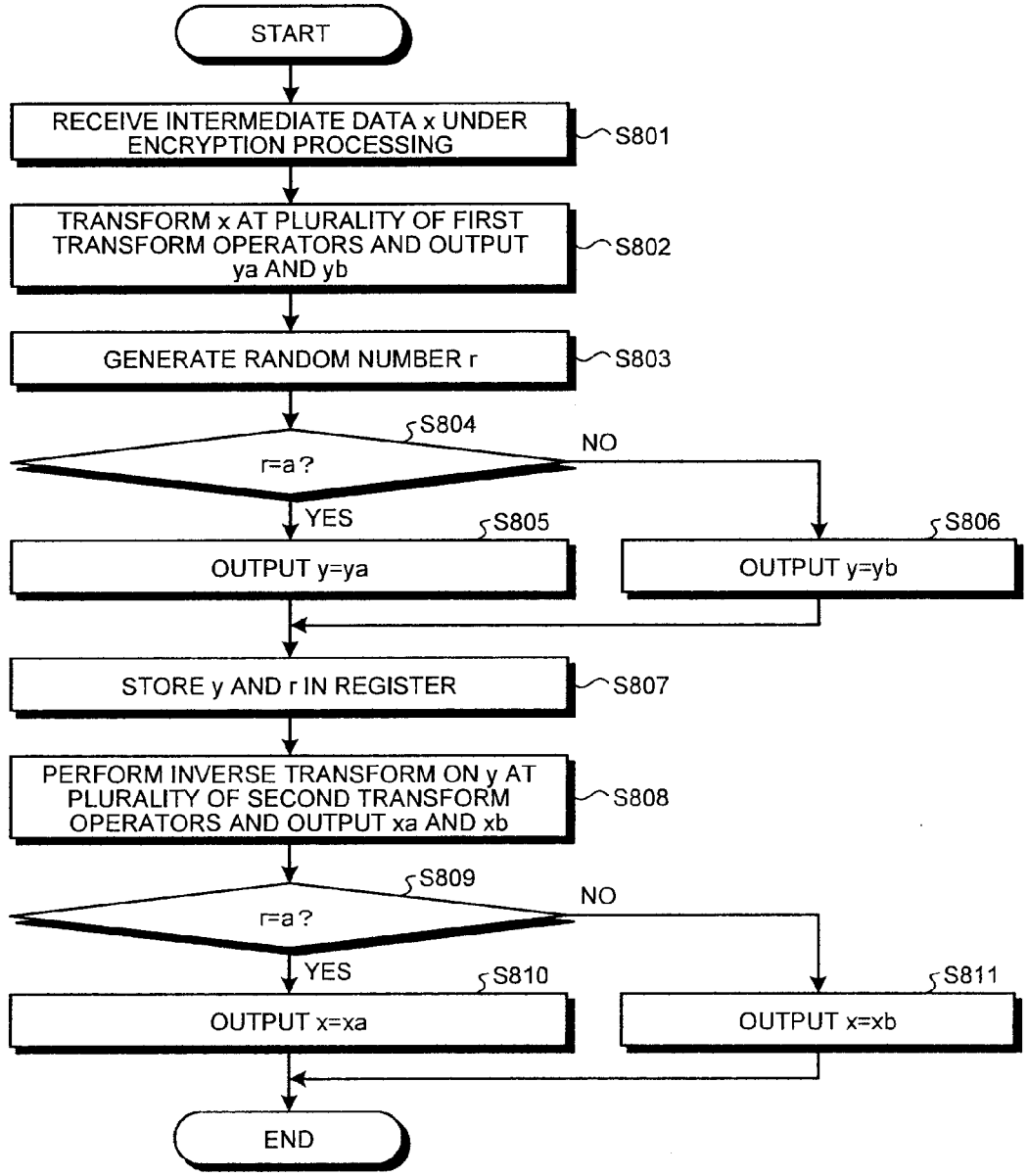
FIG. 23 is a flowchart illustrating an overall flow of data transform processing according to the fifth embodiment.

Next, data transform processing of the first transform unit 512, and the second transform unit 513 according to the fifth embodiment thus configured will be described by referring to FIG. 23. FIG. 23 is a flowchart illustrating an overall flow of the data transform processing according to the fifth embodiment.

First, the first transform unit 512 receives the intermediate data x under the encryption processing as input data (step S801). The first transform operator 1301*a* transform the data x, and outputs the transformed data ya to the first selector 1305. In the case where the first transform operator 1301*a* performs the transform using a random number that is internally generated, the first transform operator 1301*a* outputs the transformed data ya including the random number, which is used for the transform. Similarly, the first transform operator 1301*b* transform the data x, and outputs the transformed data yb to the first selector 1305 (step S802).

The random number generation unit 1304 generates the random number r, which has relationship expressed by $r(\in\{a, b\})$, as the control data of the first selector 1305. The random number generation unit 1304 supplies the random number r to the first selector 1305 and the register 602*b* (step S803).

Next, the first selector 1305 determines whether the random number r is equal to "a" (step S804). If the random number r is equal to "a" (Yes in step S804), the data ya is output as the data y (step S805). If the random number r is not equal to "a", that is, the random number r is equal to "b" (No in step S804), the first selector 1305 outputs the data yb as the data y (step S806). The register 206 stores the data y in the register 602*a*. The register 206 stores the random number r in the register 602*b* (step S807).

In the second transform unit 513, the second transform operator 1303*a* transforms the data y, and outputs it as the data xa to the second selector 1306. The second transform operator 1303*b* transforms the data y, and outputs it as the data xb to the second selector 1306 (step S808).

Next, the second selector 1306 determines whether the random number r is equal to "a" (step S809). If the random number r is equal to "a" (Yes in step S809), the data xa is output as the data x (step S810). If the random number r is not equal to "a", that is, the random number r is equal to "b" (No in step S809), the second selector 1306 outputs the data xb as the data x (step S811).

The above description has described the case where the first transform unit 512 includes the two first transform operators 1301 (the first transform operator 1301*a* and the first transform operator 1301*b*). The above description has also described the case where the second transform unit 513 includes the two second transform operators 1303 (the second transform operator 1303*a* and the second transform operator 1303*b*). The numbers of the first transform operators 1301 and the second transform operators 1303 are not limited to these, and may be equal to or more than three. This also similarly achieves the embodiments.

Accordingly, the encryption device according to the fifth embodiment randomly changes the configurations inside the first transform unit and the second transform unit for every encryption in accordance with the random number. This prevents analysis on the first transform unit and the second transform unit.

Figure 24:
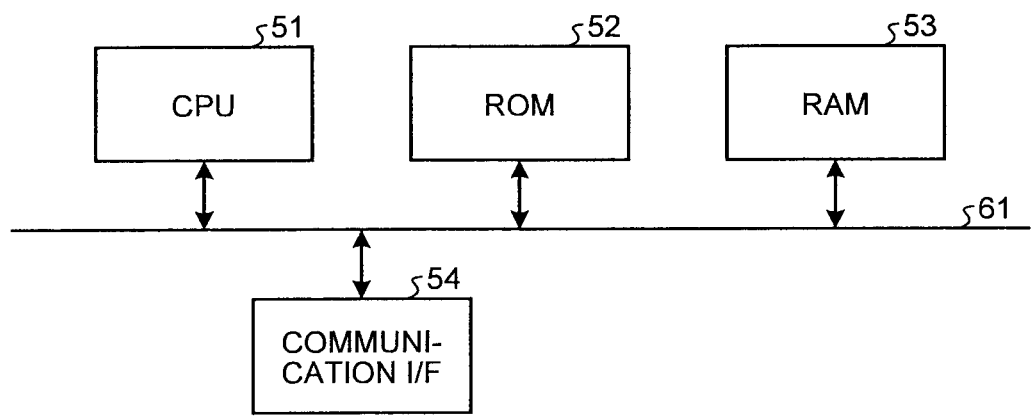
FIG. 24 is a hardware configuration diagram of the encryption devices according to each of the first to fifth embodiments.

Next, a hardware configuration of the encryption device according to each of the first to the fifth embodiment will be described by referring to FIG. 24. FIG. 24 is an explanatory view illustrating the hardware configuration of the encryption device according to the first to the fifth embodiments.

The encryption device according to each of the first to fifth embodiments includes a control device such as a CPU (Central Processing Unit) 51, a storage device such as a ROM (Read Only Memory) 52 and a RAM (Random Access Memory) 53, a communication I/F 54, which is connected to a network and performs communication, and a bus 61, which connects the respective units.

A program that is executed by the encryption device according to each of the first to fifth embodiments may be preliminary incorporated into the ROM 52 or the like.

The program that is executed in the encryption device according to each of the first to fifth embodiments may be recorded in a computer-readable recording medium such as a CD-ROM (Compact Disk Read Only Memory), a FD (flexible disk), a CD-R (Compact Disk Recordable), and a DVD (Digital Versatile Disk), in the form of an installable or an executable data file.

Further, the program that is executed in the encryption device according to each of the first to fifth embodiments may be stored in a computer connected to a network such as the Internet, and may be downloaded through the network. The program that is executed in the encryption device according to each of the first to fifth embodiments may be provided or distributed through a network such as the Internet.

The program that is executed in the encryption device according to each of the first to fifth embodiments may allow the computer to function as respective parts (the first transform unit, the second transform unit, and the like) of the above-described encryption device. The computer can perform such that the CPU 51 reads out the program from the computer-readable recording medium to load the program on a main storage device. The respective parts may be implemented by a hardware circuit.

The embodiments provide encryption devices with resistance against power analysis.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An encryption device comprising:
a register;
an input circuitry configured to receive plain data;
a first partial encryption circuitry configured to calculate first intermediate data from the plain data;
a second partial encryption circuitry configured to calculate (i+1)-th intermediate data based on i-th intermediate data and an encryption key, wherein i is an integer equal to or greater than one and smaller than N, and N is a predetermined integer equal to or greater than two;
a first transform circuitry configured to:
transform j-th intermediate data into j-th transformed data, wherein j is an integer equal to or greater than one and equal to or smaller than N; and
store the j-th transformed data in the register;
a second transform circuitry configured to transform the j-th transformed data stored in the register into the j-th intermediate data;
a third partial encryption circuitry configured to calculate encrypted data from the N-th intermediate data;
an output circuitry configured to output the encrypted data; and
a random number generation circuitry configured to:
generate a random number; and
store the random number in the register, wherein
the second partial encryption circuitry is further configured to repeat processing to calculate (j+1)-th intermediate data while j is equal to from 1 to N−1, the processing being repeated based on the j-th intermediate data and the encryption key, the j-th intermediate data being transformed from the j-th transformed data by the second transform circuitry,
the first transform circuitry is further configured to:
transform the random number into a transformed random number using a predetermined first transform processing; and
transform the j-th intermediate data into the j-th transformed data,
the j-th transformed data being masked with the transformed random number, and
the second transform circuitry is further configured to:
transform the random number stored in the register into the transformed random number using the first transform processing; and
transform the j-th transformed data stored in the register into the j-th intermediate data,
the j-th intermediate data being released from the mask using the transformed random number, and
the transformed random number not being stored in the register.

2. An encryption device comprising:
a register;
an input circuitry configured to receive plain data;
a first partial encryption circuitry configured to calculate first intermediate data from the plain data;
a second partial encryption circuitry configured to calculate (i+1)-th intermediate data based on i-th intermediate data and an encryption key, wherein i is an integer equal to or greater than one and smaller than N, and N is a predetermined integer equal to or greater than two;
a first transform circuitry configured to:
transform j-th intermediate data into j-th transformed data, wherein j is an integer equal to or greater than one and equal to or smaller than N; and
store the j-th transformed data in the register;
a second transform circuitry configured to transform the j-th transformed data stored in the register into the j-th intermediate data;
a third partial encryption circuitry configured to calculate encrypted data from the N-th intermediate data;
an output circuitry configured to output the encrypted data; and
a random number generation circuitry configured to generate a random number, wherein
the second partial encryption circuitry is further configured to repeat processing to calculate (j+1)-th intermediate data while j is equal to from 1 to N−1, the processing being repeated based on the j-th intermediate data and the encryption key, the j-th intermediate data being transformed from the j-th transformed data by the second transform engine, the first transform circuitry is further configured to:
- transform the random number into a transformed random number using a predetermined first transform processing;
- store the transformed random number in the register; and
- transform the j-th intermediate data into the j-th transformed data,
  - the j-th transformed data being masked with the random number, and the second transform circuitry is further configured to:
- transform the transformed random number stored in the register into the random number using a second transform processing,
  - the second transform processing transforming the transformed data after the transform by the first transform processing into the data before the transform by the first transform processing; and
- transform the j-th transformed data stored in the register into the j-th intermediate data,
  - the j-th intermediate data being released from the mask using the random number, and
  - the random number not being stored in the register.

3. The encryption device according to claim 2, wherein the random number generation circuitry is further configured to: generate a first random number and a second random number; and store the generated second random number in the register, the first transform circuitry is further configured to: transform the first random number into the transformed random number, the transformed random number being masked using the second random number; store the transformed random number in the register; and transform the j-th intermediate data into the j-th transformed data, the j-th transformed data being masked using the first random number, and the second transform circuitry is further configured to: transform the transformed random number stored in the register into the first random number, the first random number being released from the mask using the second random number stored in the register; and transform the j-th transformed data stored in the register into the j-th intermediate data, the j-th intermediate data being released from the mask using the first random number.

* * * * *